US012088005B2

(12) United States Patent
Igarashi

(10) Patent No.: US 12,088,005 B2
(45) Date of Patent: Sep. 10, 2024

(54) ANTENNA DEVICE AND WIRELESS COMMUNICATION APPARATUS

(71) Applicant: SONY SEMICONDUCTOR SOLUTIONS CORPORATION, Kanagawa (JP)

(72) Inventor: Takahiro Igarashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 156 days.

(21) Appl. No.: 17/763,861

(22) PCT Filed: Sep. 28, 2020

(86) PCT No.: PCT/JP2020/036679
§ 371 (c)(1),
(2) Date: Mar. 25, 2022

(87) PCT Pub. No.: WO2021/065819
PCT Pub. Date: Apr. 8, 2021

(65) Prior Publication Data
US 2022/0320743 A1 Oct. 6, 2022

(30) Foreign Application Priority Data
Oct. 4, 2019 (JP) ................................ 2019-183901

(51) Int. Cl.
*H01Q 13/08* (2006.01)
*H01Q 21/24* (2006.01)
*H01Q 19/02* (2006.01)

(52) U.S. Cl.
CPC ............ *H01Q 13/08* (2013.01); *H01Q 21/24* (2013.01); *H01Q 19/02* (2013.01)

(58) Field of Classification Search
CPC .......................... H01Q 21/065; H01Q 9/0414
See application file for complete search history.

(56) References Cited

U.S. PATENT DOCUMENTS 10,135,155 B2 * 11/2018 Sudo ..................... H01Q 21/24
10,957,982 B2 * 3/2021 Kang ..................... H01L 23/66
(Continued)

FOREIGN PATENT DOCUMENTS

CN 104662737 A 5/2015
CN 107078406 A 8/2017
(Continued)

OTHER PUBLICATIONS

International Search Report and Written Opinion of PCT Application No. PCT/JP2020/036679, issued on Nov. 24, 2020, 15 pages of ISRWO.

*Primary Examiner* — Dimary S Lopez Cruz
*Assistant Examiner* — Aladdin Abdulbaki
(74) *Attorney, Agent, or Firm* — CHIP LAW GROUP

(57) ABSTRACT

An antenna device and a wireless communication apparatus capable of improving performance are provided. The antenna device includes a first antenna element and a second antenna element disposed on the side of one surface of the first antenna element. The first antenna element includes a first glass substrate and a first patch antenna provided on the first glass substrate. The second antenna element includes a second glass substrate and a second patch antenna provided on the second glass substrate. The shape of at least one of the first patch antenna and the second patch antenna in a plan view is a rectangle. Contours of one or more of four corners of the rectangle include a curved line or a plurality of obtuse angles in a plan view.

16 Claims, 40 Drawing Sheets

(56) References Cited

U.S. PATENT DOCUMENTS

| | | | | |
|---|---|---|---|---|
| 2015/0084814 | A1* | 3/2015 | Rojanski | H01Q 21/065<br>342/368 |
| 2015/0194730 | A1 | 7/2015 | Sudo et al. | |
| 2017/0229769 | A1 | 8/2017 | Yokoyama et al. | |
| 2017/0346177 | A1* | 11/2017 | Nagata | H01Q 21/065 |
| 2018/0337458 | A1* | 11/2018 | Rodríguez | H01Q 1/2266 |
| 2019/0207304 | A1* | 7/2019 | Kim | H01L 24/25 |
| 2019/0386400 | A1* | 12/2019 | Wu | H01Q 5/371 |
| 2020/0021008 | A1* | 1/2020 | Yong | H01Q 21/005 |

FOREIGN PATENT DOCUMENTS

| | | | |
|---|---|---|---|
| EP | 2899807 | A1 | 7/2015 |
| JP | 05-167335 | A | 7/1993 |
| JP | 2000-223927 | A | 8/2000 |
| JP | 2006-229871 | A | 8/2006 |
| JP | 2006-304006 | A | 11/2006 |
| JP | 2007-097115 | A | 4/2007 |
| JP | 2020-127079 | A | 8/2020 |
| KR | 10-2015-0041054 | A | 4/2015 |
| TW | 201622509 | A | 6/2016 |
| WO | 2000/045466 | A1 | 8/2000 |
| WO | 2014/045966 | A1 | 3/2014 |
| WO | 2016/067969 | A1 | 5/2016 |

* cited by examiner

ANTENNA DEVICE AND WIRELESS COMMUNICATION APPARATUS

CROSS REFERENCE TO RELATED APPLICATIONS

This application is a U.S. National Phase of International Patent Application No. PCT/JP2020/036679 filed on Sep. 28, 2020, which claims priority benefit of Japanese Patent Application No. JP 2019-183901 filed in the Japan Patent Office on Oct. 4, 2019. Each of the above-referenced applications is hereby incorporated herein by reference in its entirety.

TECHNICAL FIELD

The present disclosure relates to an antenna device and a wireless communication apparatus.

BACKGROUND ART

An antenna device using a patch antenna is disclosed in PTL 1. The antenna device disclosed in PTL 1 includes a first semiconductor substrate in which a patch antenna is patterned on the bottom of a cavity and a second semiconductor substrate in which a part or all of a surface of an opening side of the cavity including the bottom of the cavity is covered with a conductor serving as a ground and has a laminated structure of the first and second substrates.

CITATION LIST

Patent Literature

[PTL 1]
JP 2006-229871 A

SUMMARY

Technical Problem

It is desired to improve the performance of an antenna device.

The present disclosure has been made in view of such circumstances, and an object of the present disclosure is to provide an antenna device and a wireless communication apparatus capable of improving performance.

Solution to Problem

One aspect of the present disclosure is an antenna device including a first antenna element and a second antenna element disposed on the side of one surface of the first antenna element, wherein the first antenna element includes a first glass substrate and a first patch antenna provided on the first glass substrate, and the second antenna element includes a second glass substrate and a second patch antenna provided on the second glass substrate, wherein a shape of at least one of the first patch antenna and the second patch antenna in a plan view is a rectangle, and contours of one or more of four corners of the rectangle include a curved line or a plurality of obtuse angles in a plan view.

Accordingly, it is possible to curb electric field concentration on the corners and to curb the collapse of an excitation shape due to the electric field concentration in at least one of the first patch antenna and the second patch antenna. As a result, the performance (e.g., radiation characteristics) of the antenna device can be improved.

Another aspect of the present disclosure is an antenna device including a first antenna element and a second antenna element disposed on the side of one surface of the first antenna element, wherein the first antenna element includes a first glass substrate and a first patch antenna provided on the first glass substrate, and the second antenna element includes a second glass substrate and a second patch antenna disposed on the second glass substrate, wherein the first antenna element includes a first feeding point connected to the first patch antenna, a shape of the first patch antenna in a plan view is a rectangle, and when a straight line connecting centers of a pair of edges facing each other in a first direction is defined as a first straight line and a straight line connecting centers of a pair of edges facing each other in a second direction intersecting the first direction is defined as a second straight line in the rectangle, the first feeding point is located at a position separated from the first straight line and the second straight line.

Accordingly, the antenna device can improve the depth of resonance and the band and thus the performance can be improved (for example, the band is widened).

DESCRIPTION OF EMBODIMENTS

Hereinafter, embodiments of the present disclosure will be described with reference to the drawings. In the descriptions of the drawings to be referred to hereinafter, same or similar portions are denoted by same or similar reference signs. However, it should be noted that the drawings are schematic and relationships between thicknesses and plan view dimensions, ratios of thicknesses of respective layers, and the like differ from those in reality. Therefore, specific thicknesses and dimensions should be determined by taking the following description into consideration. In addition, it is needless to say that drawings include portions where dimensional relationships and ratios differ between the drawings.

In addition, it is to be understood that definitions of directions such as up-down in the following descriptions are merely definitions provided for the sake of brevity and are not intended to limit the technical ideas of the present disclosure. For example, it is obvious that when an object is observed after being rotated by 90 degrees, up-down is converted into and interpreted as left-right, and when an object is observed after being rotated by 180 degrees, up-down is interpreted as being inverted.

Further, in the following description, a direction may be described using the words "X-axis direction," "Y-axis direction," and "Z-axis direction." For example, the Z-axis direction is a thickness direction of an antenna device 1 which will be described later. The X-axis direction and the Y-axis direction are directions orthogonal to the Z-axis direction. The X-axis direction, the Y-axis direction, and the Z-axis direction are orthogonal to each other. Further, in the following description, "plan view" means a view in the Z-axis direction.

In addition, in the present disclosure, "the same" includes not only a case of completely "the same" but also a case of substantially "the same." As a case of substantially "the same," for example, a case in which, even if there is a difference between two things, the difference is within a range of manufacturing errors is conceivable.

Embodiment 1

Figure 1:
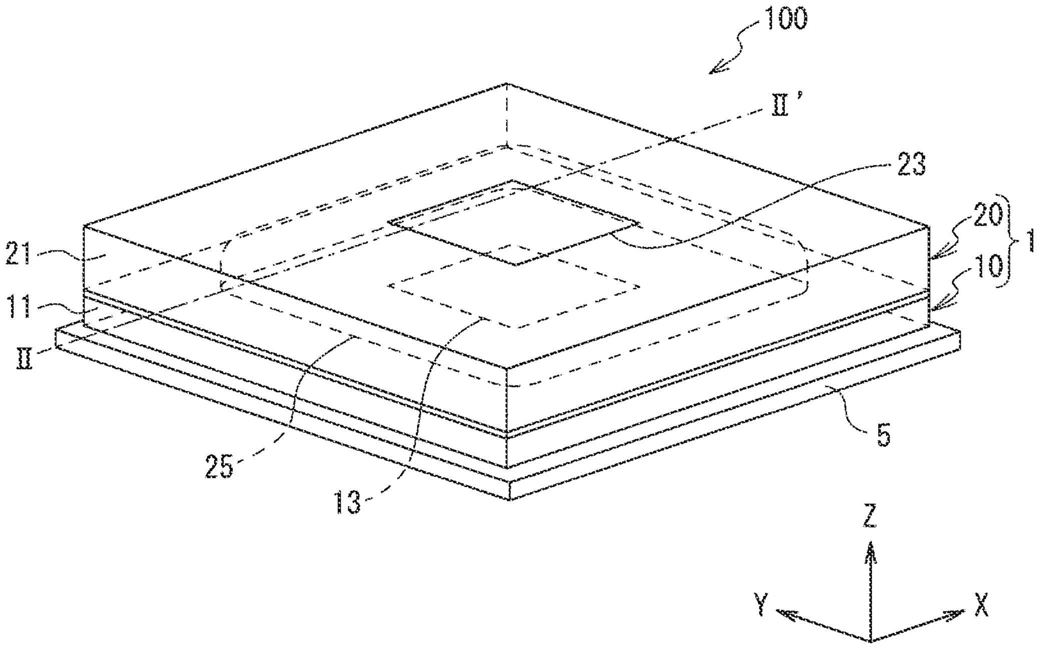
FIG. 1 is a perspective view showing a configuration example of a wireless communication apparatus according to embodiment 1 of the present disclosure.

FIG. 1 is a perspective view showing a configuration example of a wireless communication apparatus according to embodiment 1 of the present disclosure.

Figure 2:
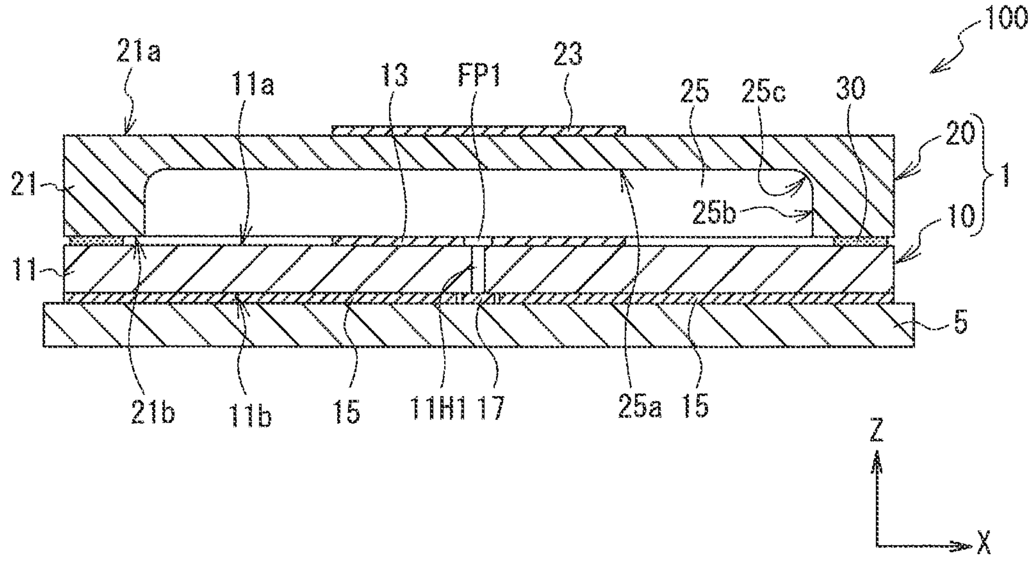
FIG. 2 is a cross-sectional view showing the configuration example of the wireless communication apparatus according to embodiment 1 of the present disclosure.

FIG. 2 is a cross-sectional view showing the configuration example of the wireless communication apparatus according to embodiment 1 of the present disclosure.

FIG. 2 shows a cross section of FIG. 1 along the X-Z plane through line II-II'. As shown in FIG. 1 and FIG. 2, the wireless communication apparatus 100 according to embodiment 1 includes an antenna device 1 and a communication circuit board 5 on which the antenna device 1 is mounted. The antenna device 1 is, for example, a device for transmitting or receiving radio waves in a millimeter wave region. The radio waves in a millimeter wave region are radio waves having a wavelength band of about 10 mm or less.

The antenna device 1 includes a first antenna element 10 and a second antenna element 20 disposed on the side of one surface of the first antenna element 10 (for example, the side of the front surface 11*a* of a first glass substrate 11). The first antenna element 10 and the second antenna element 20 are bonded to each other through a bonding material 30. As the bonding material 30, for example, an adhesive or a solder ball can be used. Further, the antenna device 1 and the communication circuit board 5 are also bonded to each other through a bonding material that is not shown.

Figure 3A:
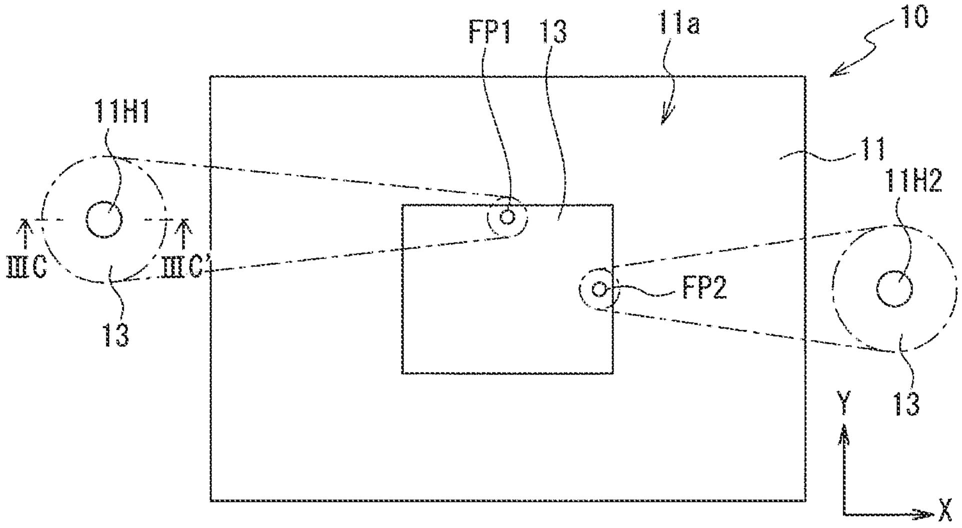
FIG. 3A is a plan view showing a configuration example of a first antenna element according to an embodiment of the present disclosure.
Figure 3B:
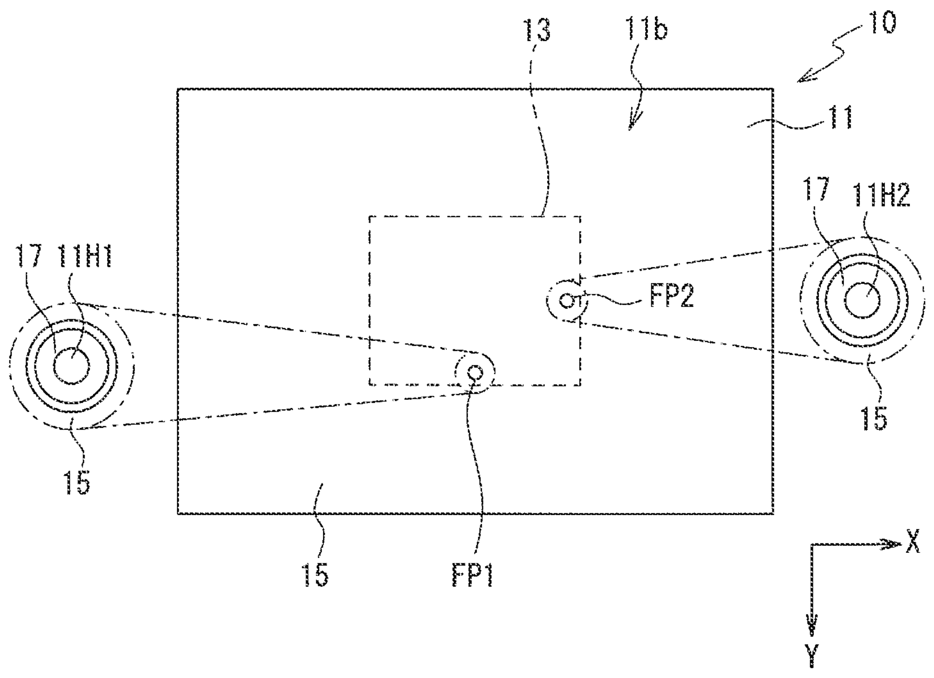
FIG. 3B is a bottom view showing the configuration example of the first antenna element according to the embodiment of the present disclosure.
Figure 3C:
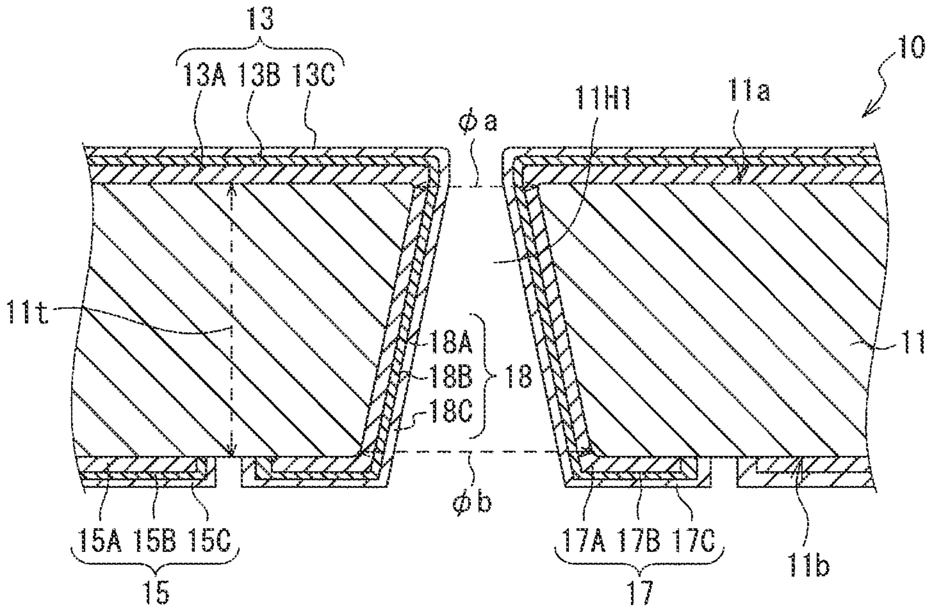
FIG. 3C is an enlarged cross-sectional view showing the configuration example of the first antenna element according to the embodiment of the present disclosure.

FIG. 3A is a plan view showing a configuration example of the first antenna element according to an embodiment of the present disclosure. FIG. 3B is a bottom view showing the configuration example of the first antenna element according to the embodiment of the present disclosure. FIG. 3C is an enlarged cross-sectional view showing the configuration example of the first antenna element according to the embodiment of the present disclosure. FIG. 3C shows a cross section of the enlarged view of FIG. 3A along line IIIC-IIIC'. As shown in FIGS. 2, 3A, 3B, and 3C, the first antenna element 10 includes the first glass substrate 11, a first patch antenna 13 provided on the side of the front surface 11*a* of the first glass substrate 11, a conductor layer 15 provided on the side of the back surface 11*b* of the first glass substrate 11, and a terminal layer 17 provided on the side of the back surface 11*b* of the first glass substrate 11. As shown in FIGS. 2, 3B, and 3C, the conductor layer 15 and the terminal layer 17 are provided on the opposite side of the first patch antenna 13 with the first glass substrate 11 interposed therebetween. The conductor layer 15 and the terminal layer 17 are separated from each other and are not electrically connected to each other.

The first glass substrate 11 is provided with a first through hole 11H1 and a second through hole 11H2 that penetrate through the front surface 11*a* and the back surface 11*b* thereof. The first through hole 11H1 and the second through hole 11H2 are separated from each other. The first patch antenna 13 is disposed on one end side of the first through hole 11H1, and the terminal layer 17 is disposed on the other end side of the first through hole 11H1. Similarly, the first patch antenna 13 is disposed on one end side of the second through hole 11H2, and the terminal layer 17 is disposed on the other end side of the second through hole 11H2. One terminal layer 17 is provided for each of the first through hole 11H1 and the second through hole 11H2.

The first through hole 11H1 and the second through hole 11H2 have the same shape and the same dimensions. The shape of the first through hole 11H1 and the second through hole 11H2 in a plan view (hereinafter referred to as a planar shape) is, for example, circular.

When the diameter of the first through hole 11H1 and the second through hole 11H2 on the side of the front surface 11*a* is φa and the diameter thereof on the side of the back surface 11*b* is φb, the diameter φa is less than the diameter φb. As an example, φa is 0.1 mm and φb is 0.125 mm. By forming the first through hole 11H1 and the second through hole 11H2 from the side of the back surface 11*b* of the first glass substrate 11, $\varphi a<\varphi b$ can be achieved.

The shapes of the first through hole 11H1 and the second through hole 11H2 are not limited to the aforementioned shape. For example, the first through hole 11H1 and the second through hole 11H2 may have a larger diameter φa on the side of the front surface 11*a* than the diameter φb on the side of the back surface 11*b*. By forming the first through hole 11H1 and the second through hole 11H2 from the side of the front surface 11*a* of the first glass substrate 11, $\varphi a>\varphi b$ can be achieved.

As shown in FIG. 3C, a connection layer 18 is provided on the inner surface of the first through hole 11H1. The first patch antenna 13 and the terminal layer 17 are electrically connected via the connection layer 18 provided on the inner surface of the first through hole 11H1. Similarly, the connection layer 18 is also provided on the inner surface of the second through hole 11H2. The first patch antenna 13 and the terminal layer 17 are electrically connected via the connection layer 18 provided on the inner surface of the second through hole 11H2.

Each of the first patch antenna 13, the conductor layer 15, the terminal layer 17, and the connection layer 18 is formed of a conductor such as copper (Cu) or a Cu alloy containing Cu as a main ingredient. Alternatively, each of the first patch antenna 13, the conductor layer 15, the terminal layer 17, and the connection layer 18 may be a laminated film in which a plurality of types of conductors are laminated. For example, as shown in FIG. 3C, the first patch antenna 13 is composed of a Cu layer 13A formed through electroplating, a nickel (Ni) layer 13B formed through electroless plating, and gold (Au) layer 13C formed through electroless plating. The Cu layer 13A, the Ni layer 13B, and the Au layer 13C are laminated in this order from the side of the first glass substrate 11.

Similarly, the conductor layer 15 is composed of a Cu layer 15A formed through electroplating, a Ni layer 15B formed through electroless plating, and an Au layer 15C formed through electroless plating. The Cu layer 15A, the Ni layer 15B, and the Au layer 15C are laminated in this order from the side of the first glass substrate 11.

The terminal layer 17 is composed of a Cu layer 17A formed through electroplating, a Ni layer 17B formed through electroless plating, and an Au layer 17C formed through electroless plating. The Cu layer 17A, the Ni layer 17B, and the Au layer 17C are laminated in this order from the side of the first glass substrate 11.

The connection layer 18 is composed of a Cu layer 18A formed through electroplating, a Ni layer 18B formed through electroless plating, and an Au layer 18C formed through electroless plating. The Cu layer 18A, the Ni layer 18B, and the Au layer 18C are laminated in this order from the side of the first glass substrate 11.

As an example of the thickness of each layer, each of the Cu layers 13A, 15A, 17A and 18A is 5.0 μm, each of the Ni layers 13B, 15B, 17B and 18B is 3.0 μm, and each of the Au layers 13C, 15C, 17C and 18C is 0.3 μm.

The junction between the connection layer 18 provided in the first through hole 11H1 and the first patch antenna 13 is a first feeding point FP1 of the first patch antenna 13. The junction between the connection layer 18 provided in the second through hole 11H2 and the first patch antenna 13 is a second feeding point FP2 of the first patch antenna 13. The second feeding point FP2 is located at a position separated from the first feeding point FP1. The first feeding point FP1 and the second feeding point FP2 are connected to impedances having the same magnitude (for example, 50Ω). As a result, the first feeding point FP1 and the second feeding point FP2 resonate with each other.

The first feeding point FP1 and the second feeding point FP2 may be connected to impedances having different magnitudes. Even in this case, the first feeding point FP1 and the second feeding point FP2 may resonate with each other.

As shown in FIG. 3A, the planar shape of the first glass substrate 11 is rectangular. The planar shape of the first patch antenna 13 is also rectangular. As shown in FIG. 3B, the planar shape of the terminal layer 17 is circular. The terminal layer 17 is provided in a region overlapping the first patch antenna 13 in a plan view. The conductor layer 15 is provided in a region overlapping the first patch antenna 13 in a plan view, except for the terminal layer 17 and the surrounding region thereof. The conductor layer 15 may be provided on the entire back surface 11*b* of the first glass substrate 11.

The first glass substrate 11 contains silicon (Si) and oxygen (O) as main ingredients. Further, the first glass substrate 11 may contain a metal element in addition to Si and O. The first glass substrate 11 has transmittance (for example, it can transmit visible light) and is colorless and transparent or colored and transparent. The transmittance is not limited to the property of transmitting visible light and may be a property of transmitting infrared rays or ultraviolet rays.

The length of the first glass substrate 11 in the vertical direction (for example, the Y-axis direction) is, for example, 5 mm or more and 25 mm or less. The length of the first glass substrate 11 in the horizontal direction (for example, the X-axis direction) is, for example, 5 mm or more and 25 mm or less. The thickness 11*t* of the first glass substrate 11 (refer to FIG. 3C) is, for example, 0.3 mm or more and 1.0 mm or less. The lengths of the first patch antenna 13 in the vertical direction and the horizontal direction depend on frequency and have a size of about ½ of the wavelength.

Figure 4A:
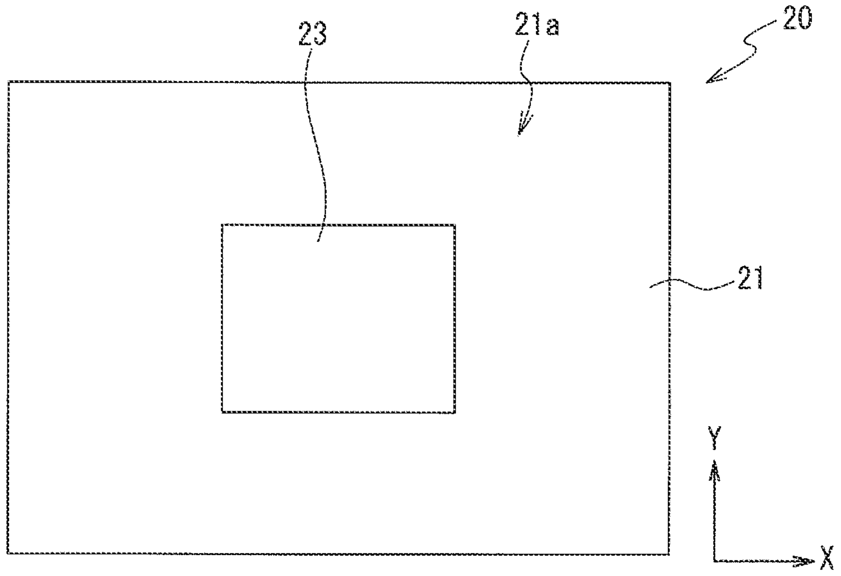
FIG. 4A is a plan view showing a configuration example of a second antenna element according to an embodiment of the present disclosure.
Figure 4B:
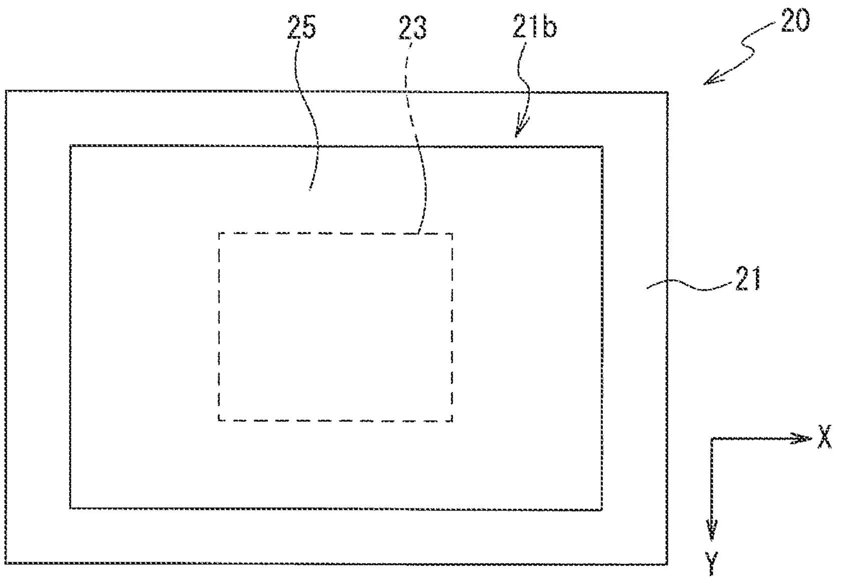
FIG. 4B is a plan view showing the configuration example of the second antenna element according to the embodiment of the present disclosure.

FIG. 4A is a plan view showing a configuration example of the second antenna element according to an embodiment of the present disclosure. FIG. 4B is a bottom view showing the configuration example of the second antenna element according to the embodiment of the present disclosure. As shown in FIGS. 2, 4A, and 4B, the second antenna element 20 includes a second glass substrate 21 and a second patch antenna 23 provided on the side of the front surface 21*a* of the second glass substrate 21. A recess 25 (an example of a second recess as a cavity) is provided on the side of the back surface 21*b* of the second glass substrate 21. The recess 25 is opened on the surface side facing the first glass substrate 11. The second patch antenna 23 is positioned on the opposite side of the bottom surface 25*a* of the recess 25. The second patch antenna 23 is formed of a conductor such as Cu or a Cu alloy, for example.

As shown in FIG. 4A, the planar shape of the second glass substrate 21 is rectangular. The planar shape of the second patch antenna 23 is also rectangular. As shown in FIG. 4B, the planar shape of the recess 25 is also rectangular. The second glass substrate 21 contains silicon (Si) and oxygen (O) as main ingredients. Further, the second glass substrate 21 may contain a metal element in addition to Si and O. The second glass substrate 21 has transmittance and is colorless and transparent or colored and transparent.

The length of the second glass substrate 21 in the vertical direction is, for example, 0.5 mm or more and 15 mm or less. The length of the second glass substrate 21 in the horizontal direction is, for example, 0.5 mm or more and 15 mm or less. The thickness of the second glass substrate 21 is, for example, 0.3 mm or more and 1.0 mm or less.

The lengths of the second patch antenna 23 in the vertical direction and the horizontal direction also depend on frequency and have a size of about ½ of the wavelength.

The first glass substrate 11 and the second glass substrate 21 may have the same shape and the same dimensions. That is, the length of the first glass substrate 11 in the vertical direction and the length and thickness thereof in the horizontal direction may be the same as the length of the second glass substrate 21 in the vertical direction and the length and thickness thereof in the horizontal direction. The first patch antenna 13 and the second patch antenna 23 may also have the same shape and the same dimensions.

The junction between the first through hole 11H1 and the first patch antenna 13 is the first feeding point FP1 of the first patch antenna 13. The junction between the second through hole 11H2 and the first patch antenna 13 is the second feeding point FP2 of the first patch antenna 13. The first patch antenna 13 is connected to a signal line through which a high frequency signal is supplied via at least one of the first feeding point FP1 and the second feeding point FP2. The second patch antenna 23 is not electrically connected to any component. The first patch antenna 13 and the second patch antenna 23 are in a resonance state. The signal line can be provided on the communication circuit board 5, but can also be provided on the first glass substrate 11.

When the first patch antenna 13 transmits or receives radio waves in a millimeter wave region, for example, the first patch antenna 13 and the second patch antenna 23 resonate with each other. The conductor layer 15 is a ground and serves as a reflective layer. As a result, the antenna device 1 has directivity in the normal direction (for example, the Z-axis direction) of the first patch antenna 13. The antenna device 1 can transmit radio waves in the millimeter wave region in the normal direction (for example, the Z-axis direction) of the first patch antenna 13 and receive radio waves in the Z-axis direction.

The substrate constituting the first patch antenna 13 and the substrate constituting the second patch antenna are made of glass. The dielectric constant of the glass is lower than that of semiconductors such as silicon. Further, the recess 25 is positioned between the first patch antenna 13 and the second patch antenna 23, and an air layer exists inside the recess 25. The dielectric constant of the air layer is lower than that of the glass. Due to the presence of the glass and the air layer instead of a semiconductor between the first patch antenna 13 and the second patch antenna 23, the antenna device 1 can transmit or receive radio waves in the millimeter wave region with a high gain in a wide band.

Figure 5A:
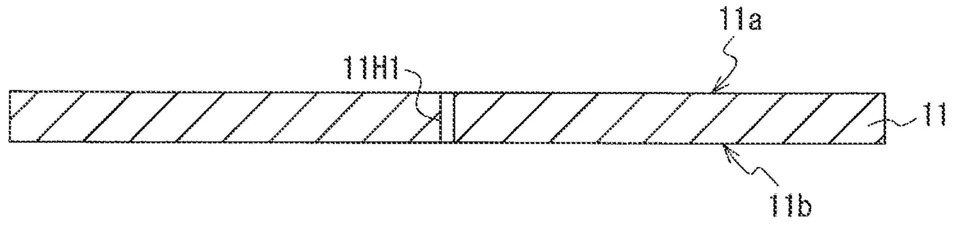
FIG. 5A is a cross-sectional view showing a method for manufacturing the first antenna element according to embodiment 1 of the present disclosure in the order of processes.
Figure 5B:
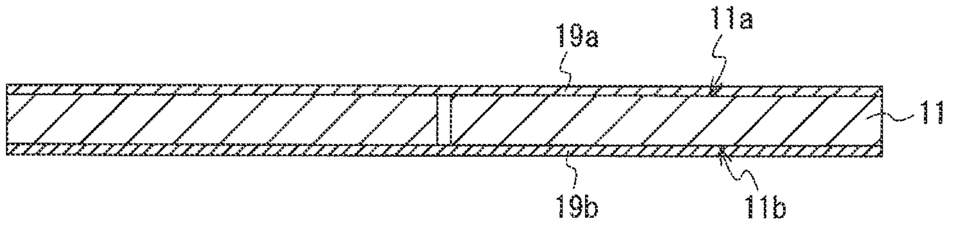
FIG. 5B is a cross-sectional view showing the method for manufacturing the first antenna element according to embodiment 1 of the present disclosure in the order of processes.
Figure 5C:
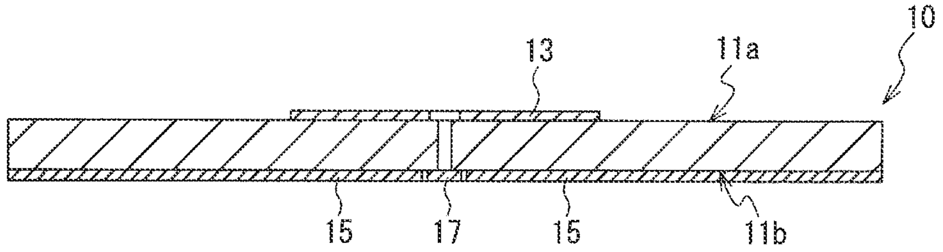
FIG. 5C is a cross-sectional view showing the method for manufacturing the first antenna element according to embodiment 1 of the present disclosure in the order of processes.
Figure 6A:
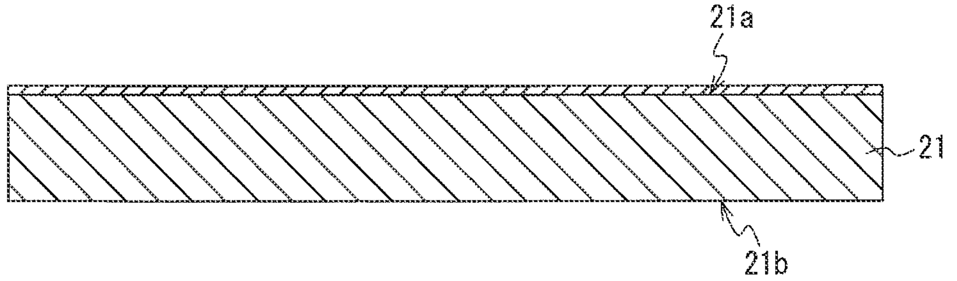
FIG. 6A is a cross-sectional view showing a method for manufacturing the second antenna element according to embodiment 1 of the present disclosure in the order of processes.
Figure 6B:
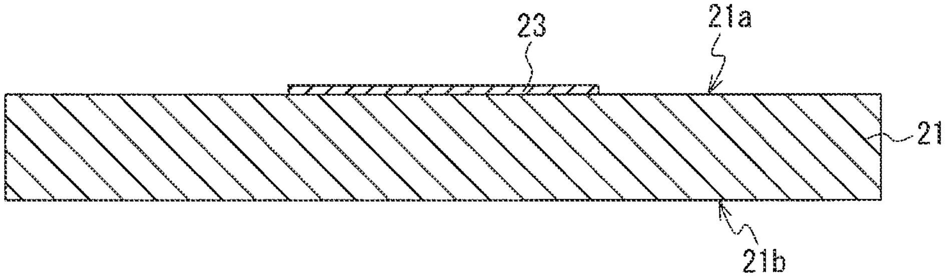
FIG. 6B is a cross-sectional view showing the method for manufacturing the second antenna element according to embodiment 1 of the present disclosure in the order of processes.
Figure 6C:
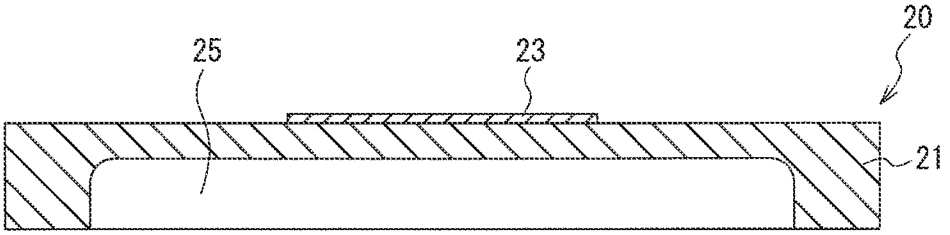
FIG. 6C is a cross-sectional view showing the method for manufacturing the second antenna element according to embodiment 1 of the present disclosure in the order of processes.
Figure 7:
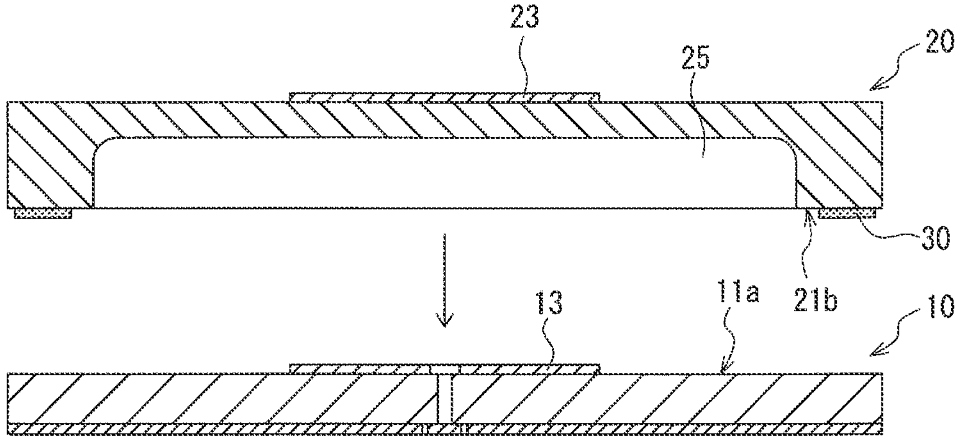
FIG. 7 is a cross-sectional view showing a process of attaching the second antenna element to the first antenna element.
Figure 8:
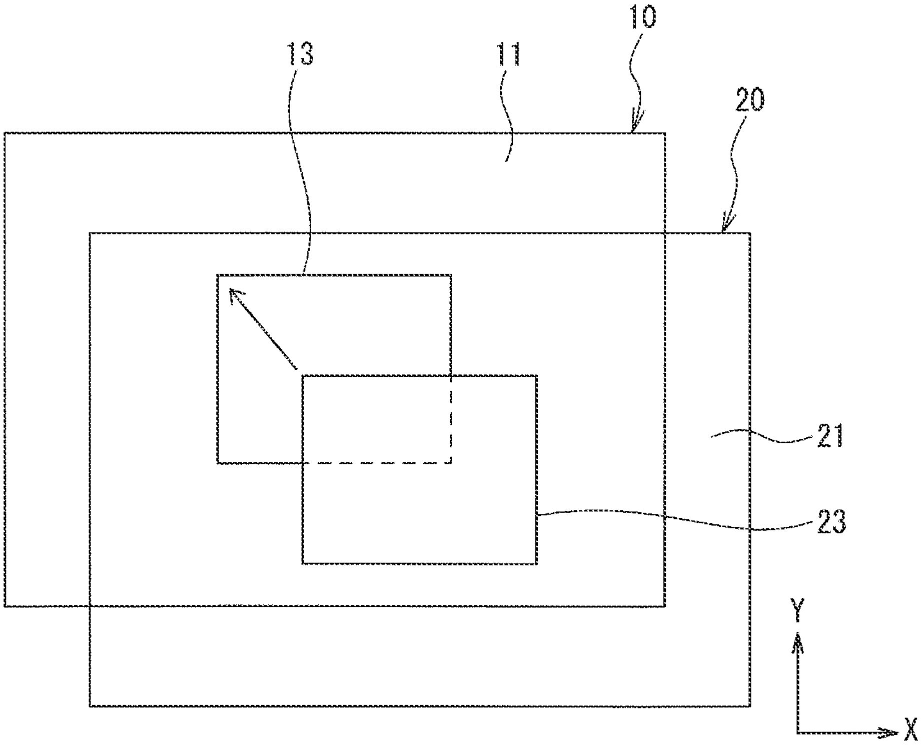
FIG. 8 is a plan view showing an example of a method for aligning the first antenna element and the second antenna element.

Next, a method of manufacturing the antenna device 1 will be described. FIGS. 5A, 5B, and FIG. 5C are cross-sectional views showing a method for manufacturing the first antenna element according to embodiment 1 of the present disclosure in the order of processes. FIGS. 6A, 6B, and 6C are cross-sectional views showing a method for manufacturing the second antenna element according to embodiment 1 of the present disclosure in the order of processes. FIG. 7 is a cross-sectional view showing a process of attaching the second antenna element to the first antenna element. FIG. 8 is a plan view showing an example of a method for aligning the first antenna element and the second antenna element. The antenna device 1 may be manufactured, for example, by using various jigs or devices such as a laser, a drill or an end mill for forming through holes in a glass substrate, an electrolytic plating or electroless plating device for forming copper on a glass substrate, a device for wet-etching copper, a device for aligning glass substrates, and a device for bonding the glass substrates in the aligned state. Hereinafter, jigs or devices for manufacturing the antenna device 1 are collectively referred to as a manufacturing device.

First, a method for manufacturing the first antenna element 10 will be described. As shown in FIG. 5A, the manufacturing device forms the first through hole 11H1 and the second through hole 11H2 in the first glass substrate 11. Next, as shown in FIG. 5B, the manufacturing device respectively forms copper 19*a* and 19*b* on the front surface 11*a* and the back surface 11*b* of the first glass substrate 11 and also forms copper on the inner surface of the first through hole 11H1 and the inner surface of the second through hole 11H2 (refer to FIGS. 3A and 3B, for example) through electrolytic plating. Next, the manufacturing device patterns the copper 19*a* and 19*b* through photolithography and wet etching techniques. A solution containing ferric chloride is used for etching the copper 19*a* and 19*b*. As a result, the first patch antenna 13 is formed from the copper on the side of the front surface 11*a*, as shown in FIG. 5C. The conductor layer 15 and the terminal layer 17 are formed from the copper on the side of the back surface 11*b*. The copper in the first through hole 11H1 and the copper in the second through hole 11H2 form the connection layer 18. Through the above-described process, the first antenna element 10 is completed.

As shown in FIG. 3C, the first patch antenna 13, the conductor layer 15, the terminal layer 17, and the connection layer 18 may be a laminated film containing Cu, Ni, and Au. In this case, the manufacturing device may form a Cu layer through electrolytic plating and form a Ni layer and an Au layer through electroless plating, for example.

Next, a method for manufacturing the second antenna element 20 will be described. As shown in FIG. 6A, the manufacturing device forms copper 29 on the front surface 21*a* of the second glass substrate 21 through electrolytic plating, for example. Next, the manufacturing device patterns the copper 29 through photolithography and wet etching techniques. A solution containing ferric chloride is used for etching the copper 29.

As a result, the second patch antenna 23 is formed from the copper 29, as shown in FIG. 6B. Next, the manufacturing device etches the side of the back surface 21*b* of the second glass substrate 21 through photolithography and wet etching techniques. A solution containing hydrogen fluoride (HF) is used for etching the second glass substrate 21. As a result, the recess 25 is formed on the side of the back surface 21*b* of the second glass substrate 21, as shown in FIG. 6C. Through the above-described process, the second antenna element 20 is completed.

Meanwhile, since the recess 25 is formed through isotropic etching, a boundary 25*c* between the bottom surface 25*a* and the inner side surface 25*b* of the recess 25 is formed in a rounded shape instead of an angular shape.

Next, a method for attaching the second antenna element 20 to the first antenna element 10 will be described. As shown in FIG. 7, the manufacturing device applies the bonding material 30 to a circumferential edge portion positioned around the recess 25 on the side of the back surface 21*b* of the second glass substrate 21 of the second antenna element 20. Alternatively, the manufacturing device applies the bonding material 30 to a portion facing the circumferential edge portion on the side of the front surface 11*a* of the first glass substrate 11 of the first antenna element 10. Next, the manufacturing device aligns the side of the front surface 11*a* of the first glass substrate 11 with the side of the back surface 21*b* of the second glass substrate 21 such that they face each other. Then, the manufacturing device bonds the first glass substrate 11 and the second glass substrate 21 to each other through the bonding material 30. As a result, the second antenna element 20 is attached to the first antenna element 10, and thus the antenna device 1 is completed.

In the above-described alignment process, the manufacturing device uses the first patch antenna 13 provided on the first glass substrate 11 and the second patch antenna 23 provided on the second glass substrate 21 as alignment marks. When the first glass substrate 11 and the second glass substrate 21 are aligned as designed, the first patch antenna 13 and the second patch antenna 23 are formed to overlap each other in a plan view.

For example, it is assumed that the first patch antenna 13 and the second patch antenna 23 have the same planar shape and the same size. In this case, in the alignment process, the manufacturing device relatively moves the second glass substrate 21 with respect to the first glass substrate 11 such that the first patch antenna 13 and the second patch antenna 23 overlap in a plan view and the contour of the first patch antenna 13 and the contour of the second patch antenna 23 match, as shown in FIG. 8. As a result, the manufacturing device can align the first glass substrate 11 and the second glass substrate 21 with high accuracy.

As another example, it is assumed that the first patch antenna 13 and the second patch antenna 23 have the same planar shape and one of the first patch antenna 13 and the second patch antenna 23 is smaller than the other. In this case, the manufacturing device relatively moves the second glass substrate 21 with respect to the first glass substrate 11 such that the center position of the first patch antenna 13 and the center position of the second patch antenna 23 overlap in a plan view and each side of the outer circumference of the first patch antenna 13 is parallel to each side of the outer circumference of the second patch antenna 23. As a result, the manufacturing device can align the first glass substrate 11 and the second glass substrate 21 with high accuracy.

A device for aligning the glass substrates includes at least one of a first imaging device disposed on the side of the front surface 21*a* of the second glass substrate 21 and a second imaging device disposed on the side of the back surface 11*b* of the first glass substrate 11. The second glass substrate 21 has transmittance. Accordingly, the first imaging device disposed on the side of the front surface 21*a* of the second glass substrate 21 can capture an image of the second patch antenna 23 and also capture an image of the first patch antenna 13 through the second glass substrate 21.

In addition, not only the second glass substrate 21 but also the first glass substrate 11 has transmittance. Accordingly, the second imaging device disposed on the side of the back surface 11*b* of the first glass substrate 11 can capture an image of the first patch antenna 13 through the first glass substrate 11 and capture an image of the second patch antenna 23 through the first glass substrate 11 and the second glass substrate 21. From this captured data, the device for aligning the glass substrates can detect the positions of the first patch antenna 13 and the second patch antenna 23.

Figure 9:
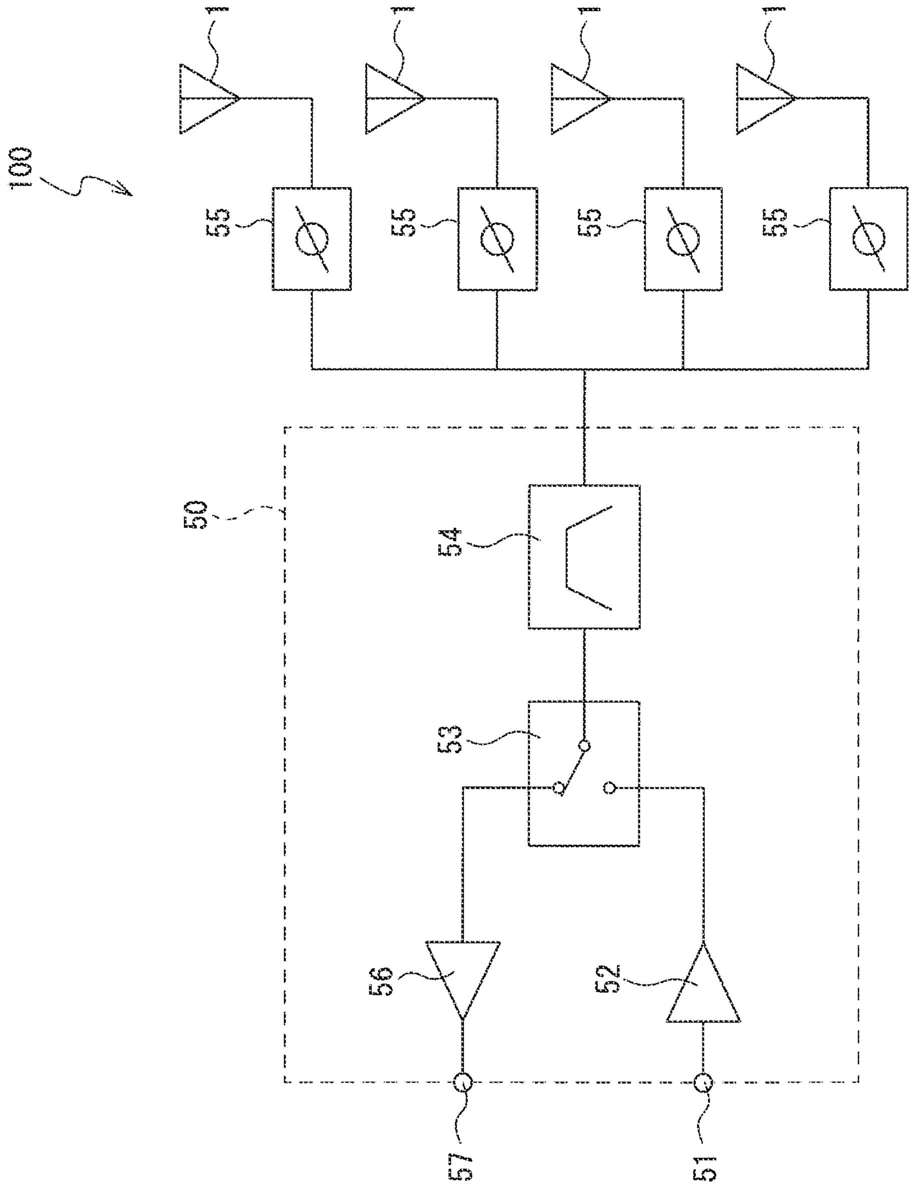
FIG. 9 is a block diagram showing a configuration example of a wireless communication circuit according to embodiment 1 of the present disclosure.

Next, a configuration example of the wireless communication circuit provided on the communication circuit board 5 will be described. FIG. 9 is a block diagram showing a configuration example of the wireless communication circuit according to embodiment 1 of the present disclosure. FIG. 9 illustrates a case where a plurality of antenna devices 1 are connected to one wireless communication circuit 50. The plurality of antenna devices 1 may cover different bands, or at least parts of bands covered thereby may overlap each other.

As shown in FIG. 9, the wireless communication circuit 50 according to embodiment 1 includes an input terminal 51, a transmission amplifier 52, a switch 53, a filter 54, a reception amplifier 56, and an output terminal 57. A high frequency signal (for example, a millimeter wave signal) is input to the input terminal 51. The transmission amplifier 52 has a function of amplifying the high frequency signal input to the input terminal 51. The switch 53 has a function of switching a connection destination of the filter 54 from one of the transmission amplifier 52 and the reception amplifier 56 to the other. The filter 54 has a function of removing unnecessary frequency components from the high frequency signal. The filter 54 is connected to a plurality of phase shifters 55 via a signal line provided on the communication circuit board 5. The plurality of phase shifters 55 are provided on the communication circuit board 5. The plurality of phase shifters 55 are respectively connected to the terminal layers 17 of the plurality of antenna devices 1 via signal lines provided on the communication circuit board 5. The reception amplifier 56 has a function of amplifying signals received by the antenna devices 1. The amplified received signals are output from the output terminal 57. The plurality of antenna devices 1 shown in FIG. 9 may have the same radio wave band and resonance point or may have different radio wave bands and resonance points.

Meanwhile, although FIG. 9 illustrates a case where the plurality of antenna devices 1 are connected to one wireless communication circuit 50, embodiments of the present disclosure is not limited thereto. In embodiments of the present disclosure, one antenna device 1 may be connected to one wireless communication circuit 50.

As described above, the wireless communication apparatus 100 according to embodiment 1 of the present disclosure includes the antenna device 1 and the wireless communication circuit 50 connected to the antenna device 1. The antenna device 1 includes the first antenna element 10 and the second antenna element 20 disposed on the side of one surface of the first antenna element 10. The first antenna element 10 includes the first glass substrate 11 and the first patch antenna 13 provided on the first glass substrate 11. The second antenna element 20 includes the second glass substrate 21 and the second patch antenna 23 provided on the second glass substrate 21. At least a part of the first patch antenna 13 faces the second patch antenna 23 through a cavity (for example, the recess 25).

Accordingly, a patch antenna having a cavity stack structure in which the first patch antenna 13 and the second patch antenna 23 are laminated via a cavity is constructed. The antenna device 1 can transmit or receive radio waves in the millimeter wave region by using the patch antenna having the cavity stack structure. Since the dielectric constant between the first patch antenna 13 and the second patch antenna 23 is kept low by the air layer in the glass substrate and the recess 25, generation of surface waves can be curbed. The antenna device 1 can transmit or receive radio waves in the millimeter wave region with a high gain in a wide band.

Further, since the first glass substrate 11 and the second glass substrate 21 have a lower dielectric constant than semiconductors, the antenna device 1 can curb a dielectric loss in the first patch antenna 13 and the second patch antenna 23 to be low and maintain high antenna efficiency.

The glass substrate can be made into a panel (large area), and more first antenna elements 10 or second antenna elements 20 can be obtained from one substrate as compared to a semiconductor substrate. As a result, the manufacturing cost of the antenna device 1 can be reduced.

The first glass substrate 11 and the second glass substrate 21 have smaller dimensional changes with respect to heat and stable dimensional accuracy as compared to an organic substrate formed of an organic material. The first glass substrate 11 and the second glass substrate 21 can be wet-etched using a solution containing hydrogen fluoride and have high processing accuracy.

In general, the higher the frequency band of transmitted or received radio waves, the smaller the size of an antenna. When the size of the antenna changes, the frequency band of the transmitted or received radio waves changes. Accordingly, in particular, an antenna that transmits or receives radio waves in the millimeter wave is required to have high dimensional accuracy. As described above, since the antenna device 1 has stable dimensional accuracy and high processing accuracy, it is possible to curb changes in the band and improve antenna characteristics.

The recess 25 is provided in the second glass substrate 21. The circumference of the recess 25 has a frame structure. This frame structure increases the rigidity of the second glass substrate 21 and contributes to stabilization of the dimensional accuracy of the second glass substrate 21.

Further, the first glass substrate 11 and the second glass substrate 21 have transmittance. Accordingly, it is possible to capture an image of the first patch antenna 13 from the side of the front surface 21*a* of the second glass substrate 21 through the second glass substrate 21 or capture an image of the second patch antenna from the side of the back surface 11*b* of the first glass substrate 11 through the first glass substrate 11. It is easy to align the first glass substrate and the second glass substrate.

Embodiment 2

In the above-described embodiment 1, the recess 25 in provided in the second glass substrate 21. However, embodiments of the present disclosure are not limited thereto. The cavity positioned between the first patch antenna 13 and the second patch antenna 23 may be provided in the first glass substrate 11 instead of the second glass substrate 21.

Figure 10:
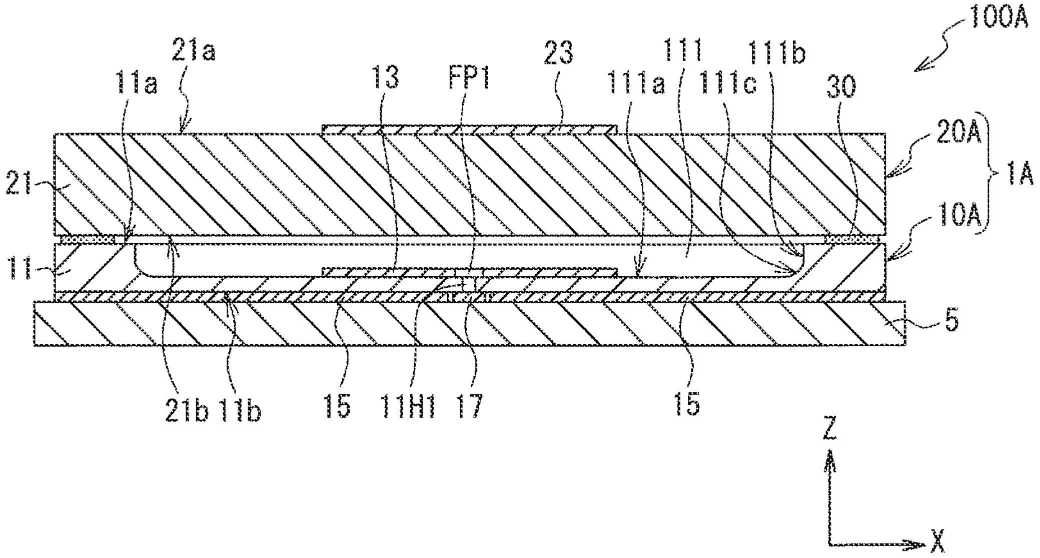
FIG. 10 is a perspective view showing a configuration example of a wireless communication apparatus according to embodiment 2 of the present disclosure.

FIG. 10 is a perspective view showing a configuration example of a wireless communication apparatus according to embodiment 2 of the present disclosure. As shown in FIG. 10, a wireless communication apparatus 100A according to embodiment 2 includes an antenna device 1A. The antenna device 1A includes a first antenna element 10A and a second antenna element 20A disposed on the side of one surface of the first antenna element 10A.

The first antenna element 10A has a recess 111 (an example of a first recess as a cavity) provided on the side of the front surface 11*a* of the first glass substrate 11. The planar shape of the recess 111 is rectangular. The first patch antenna 13 is provided on the bottom surface 12*a* of the recess 111. In the second antenna element 20A, the recess 25 (refer to FIG. 2) may or may not be provided on the side of the back surface 21*b* of the second glass substrate 21. FIG. 10 illustrates a case where the recess 25 is not provided in the second glass substrate 21. Since the recess 111 is formed through isotropic etching, a boundary 111*c* between the bottom surface 111*a* and the inner surface 111*b* of the recess 111 is formed in a rounded shape instead of an angular shape.

In the antenna device 1A, a cavity (for example, the recess 111) is also present between the first patch antenna 13 and the second patch antenna 23. The dielectric constant between the first patch antenna 13 and the second patch antenna 23 is kept low by the air layer in the recess 111.

Accordingly, the antenna device 1A can transmit or receive radio waves in the millimeter wave region with a high gain in a wide band.

Embodiment 3

In the above-described embodiment 1, the first patch antenna 13 and the second patch antenna 23 are used as alignment marks. However, embodiments of the present disclosure are not limited thereto. Any pattern may be used as an alignment mark.

Figure 11:
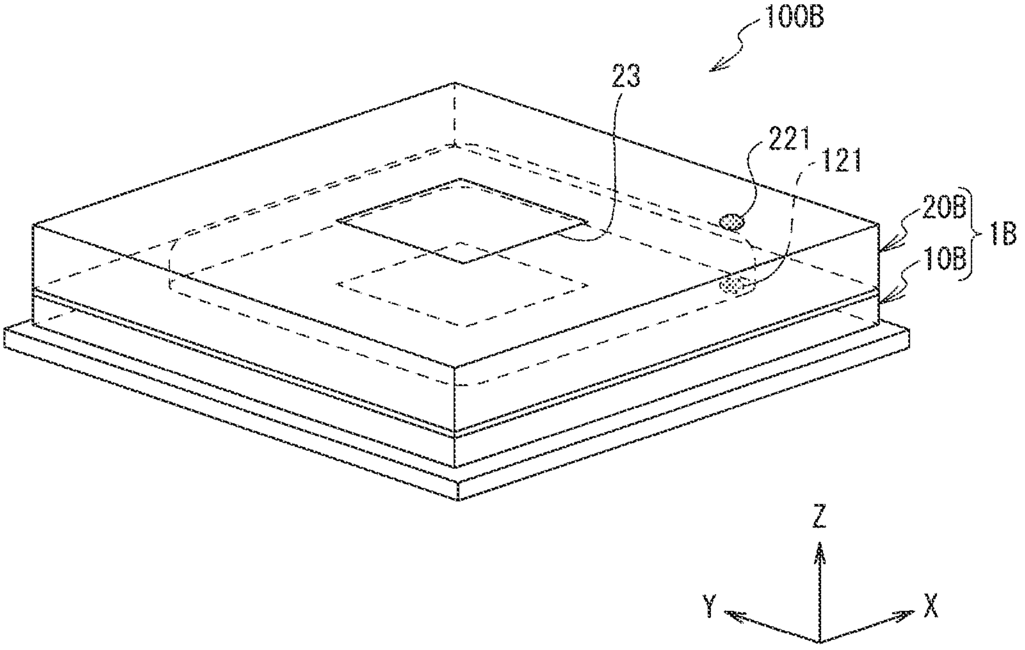
FIG. 11 is a perspective view showing a configuration example of a wireless communication apparatus according to embodiment 3 of the present disclosure.

FIG. 11 is a perspective view showing a configuration example of a wireless communication apparatus according to embodiment 3 of the present disclosure. As shown in FIG. 11, a wireless communication apparatus 100B according to embodiment 3 includes an antenna device 1B. The antenna device 1B includes a first antenna element 10B and a second antenna element 20B disposed on the side of one surface of the first antenna element 10B.

The first antenna element 10B has a first alignment mark 121 provided on the side of the front surface 11*a* or the back surface 11*b* of the first glass substrate 11. FIG. 11 illustrates a case where the first alignment mark 121 is provided on the side of the front surface 11*a* of the first glass substrate 11. For example, the first alignment mark 121 is formed at the same time as the first patch antenna 13 through the same process. As a result, the first alignment mark 121 is formed of the same material (as an example, Cu or a Cu alloy) and have the same film thickness as the first patch antenna 13. The first alignment mark 121 may have an arbitrary planar shape such as a perfect circle, an ellipse, a rectangle, or a cross shape.

The second antenna element 20B has a second alignment mark 221 provided on the side of the front surface 21*a* or the back surface 21*b* of the second glass substrate 21. FIG. 11 illustrates a case where the second alignment mark 221 is provided on the side of the front surface 21*a* of the second glass substrate 21. For example, the second alignment mark 221 is formed at the same time as the second patch antenna 23 through the same process. As a result, the second alignment mark 221 is formed of the same material (as an example, Cu or a Cu alloy) and have the same film thickness as the second patch antenna 23. The second alignment mark 221 may have an arbitrary planar shape such as a perfect circle, an ellipse, a rectangle, or a cross shape.

When the first glass substrate 11 and the second glass substrate 21 are aligned as designed, the first alignment mark 121 and the second alignment mark 221 are formed to overlap each other in a plan view. Even in such a configuration, the manufacturing device can align the first glass substrate 11 and the second glass substrate 21 with high accuracy using the first alignment mark 121 and the second alignment mark 221.

The manufacturing device may align the first glass substrate 11 and the second glass substrate 21 using both the first patch antenna 13 and the second patch antenna 23, and the first alignment mark 121 and the second alignment mark 221. Accordingly, the number of marks used for alignment increases, and thus the accuracy of alignment is improved.

Alternatively, a plurality of first alignment marks 121 and a plurality of second alignment marks 221 may be provided. The manufacturing device may align the first glass substrate 11 and the second glass substrate 21 such that the plurality of first alignment marks 121 and the plurality of second alignment marks 221 respectively overlap each other in a plan view. In this case, the number of marks used for alignment also increases, and thus the accuracy of alignment is improved.

Embodiment 4

In embodiments of the present disclosure, the antenna device 1 may include an end fire antenna in addition to the first patch antenna 13 and the second patch antenna 23.

Figure 12:
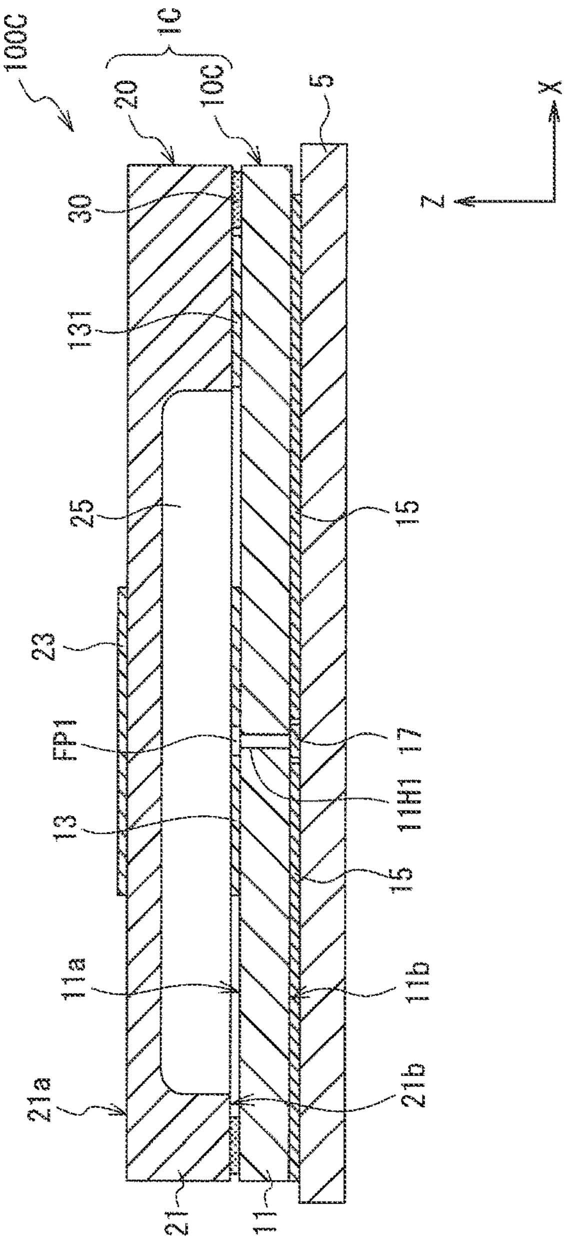
FIG. 12 is a perspective view showing a configuration example of a wireless communication apparatus according to embodiment 4 of the present disclosure.

FIG. 12 is a perspective view showing a configuration example of a wireless communication apparatus according to embodiment 4 of the present disclosure. As shown in FIG. 12, a wireless communication apparatus 100C according to embodiment 4 includes an antenna device 1C. The antenna device 1C includes a first antenna element 10C and a second antenna element 20 disposed on the side of one surface of the first antenna element 10C.

The first antenna element 10C includes an end fire antenna 131 provided on the side of the back surface 11*b* of the first glass substrate 11. The planar shape of the end fire antenna 131 is a rectangle that extends long in one direction (for example, in the Y-axis direction). The end fire antenna 131 is formed at the same time as the conductor layer 15 and the terminal layer 17 through the same process. As a result, the end fire antenna 131 is formed of the same material (as an example, Cu or Cu alloy) and have the same film thickness as the conductor layer 15 and the terminal layer 17.

The end fire antenna 131 is connected to a signal line through which a high frequency signal is supplied. The end fire antenna 131 is not electrically connected to either the conductor layer 15 or the terminal layer 17. The end fire antenna 131 has a directivity in the horizontal direction parallel to the first patch antenna 13 and orthogonal to the above-mentioned one direction (for example, the X-axis direction). As a result, the antenna device 1C can transmit radio waves in the millimeter wave region in the X-axis direction or receive radio waves in the millimeter wave region in the X-axis direction via the end fire antenna 131. The antenna device 1C has a directivity not only in the normal direction of the first patch antenna 13 but also in the horizontal direction of the first patch antenna 13 and thus can cover a wider area.

Meanwhile, FIG. 12 shows a case where one end fire antenna 131 is provided for one first patch antenna 13. However, this is merely an example. The first antenna element 10C may include a plurality of end fire antennas 131 for one first patch antenna 13. In this case, the plurality of end fire antennas 131 may have a directivity in the same direction or directivities in different directions. For example, among the plurality of end fire antennas 131, the first end fire antenna may have a directivity in the X-axis direction and the second end fire antenna may have a directivity in the Y-axis direction. As a result, the antenna device 1C can cover a wider area.

Embodiment 5

In the above-described embodiment 1, the bottom surface of the recess of the second glass substrate 21 is flat. However, embodiments of the present disclosure are not limited thereto. The bottom surface 25*a* of the recess 25 of the second glass substrate 21 may be uneven.

Figure 13:
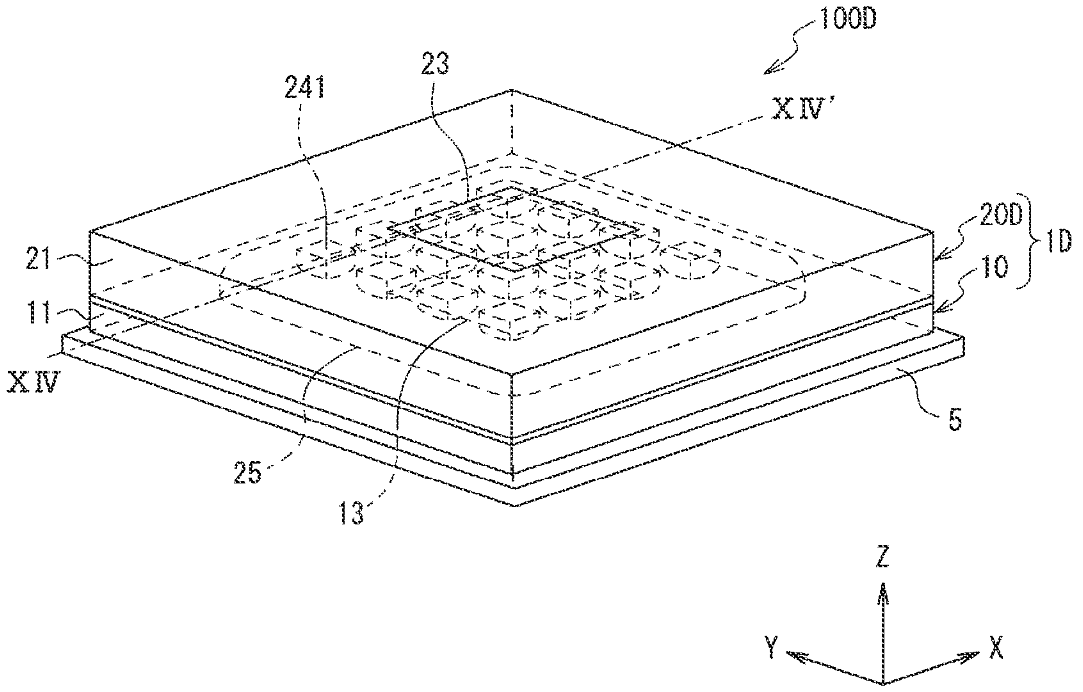
FIG. 13 is a perspective view showing a configuration example of a wireless communication apparatus according to embodiment 5 of the present disclosure.
Figure 14:
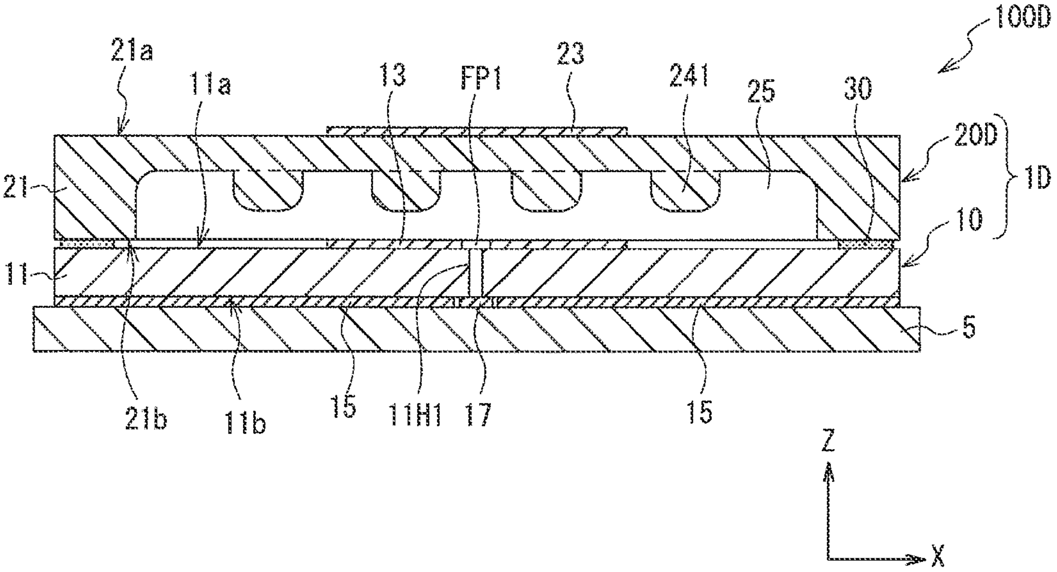
FIG. 14 is a cross-sectional view showing the configuration example of the wireless communication apparatus according to embodiment 5 of the present disclosure.

FIG. 13 is a perspective view showing a configuration example of a wireless communication apparatus according to embodiment 5 of the present disclosure. FIG. 14 is a cross-sectional view showing the configuration example of the wireless communication apparatus according to embodiment 5 of the present disclosure. FIG. 14 shows a cross section of FIG. 13 along the X-Z plane through XIV-XIV' line. As shown in FIG. 13 and FIG. 14, a wireless communication apparatus 100D according to embodiment 5 includes an antenna device 1D. The antenna device 1D includes a first antenna element 10 and a second antenna element 20D disposed on the side of one surface of the first antenna element 10.

In the second antenna element 20D, a plurality of protrusions 241 are provided on the bottom surface 25*a* of the recess 25. The plurality of protrusions 241 have the same shape and the same size, for example. The plurality of protrusions 241 are arranged at equal intervals in the X-axis direction and at equal intervals in the Y-axis direction. The arrangement interval of the plurality of protrusions 241 in the X-axis direction and the arrangement interval in the Y-axis direction may be the same or different from each other. At least some of the plurality of protrusions 241 are positioned between the first patch antenna 13 and the second patch antenna 23.

The plurality of protrusions 241 may be provided integrally with the second glass substrate 21. When the plurality of protrusions 241 are provided integrally with the second glass substrate 21, the plurality of protrusions 241 are formed by etching the bottom surface 25*a* of the recess 25 through photolithography and wet etching techniques. Since the bottom surface 25*a* of the recess 25 is glass, a solution containing hydrogen fluoride is used for wet etching.

Since the plurality of protrusions 241 are present at equal intervals in the X-axis direction and the Y-axis direction, the dielectric constant between the first patch antenna 13 and the second patch antenna 23 periodically changes in the X-axis direction and the Y-axis direction. As a result, the band and resonance point of the antenna device 1D shifts from a band and resonance point when the bottom surface 25*a* of the recess 25 is not uneven.

The plurality of protrusions 241 shift the band and resonance point of the antenna device 1D. Shift amounts of the band and resonance point of the antenna device 1D are values depending on the shape, size, arrangement, and the like of the plurality of protrusions 241. It is possible to adjust the band and resonance point of the antenna device 1D by arbitrarily designing the shape, size, arrangement, and the like of the plurality of protrusions 241. In embodiment 5, the plurality of protrusions 241 may have different shapes or different sizes. Even in such a configuration, the band and resonance point can be adjusted.

Embodiment 6

In the above-described embodiment 1, one recess 25 is provided in the second glass substrate 21. However, in the present disclosure, the number of recesses 25 provided in the second glass substrate 21 is not limited to one and may be plural.

Figure 15:
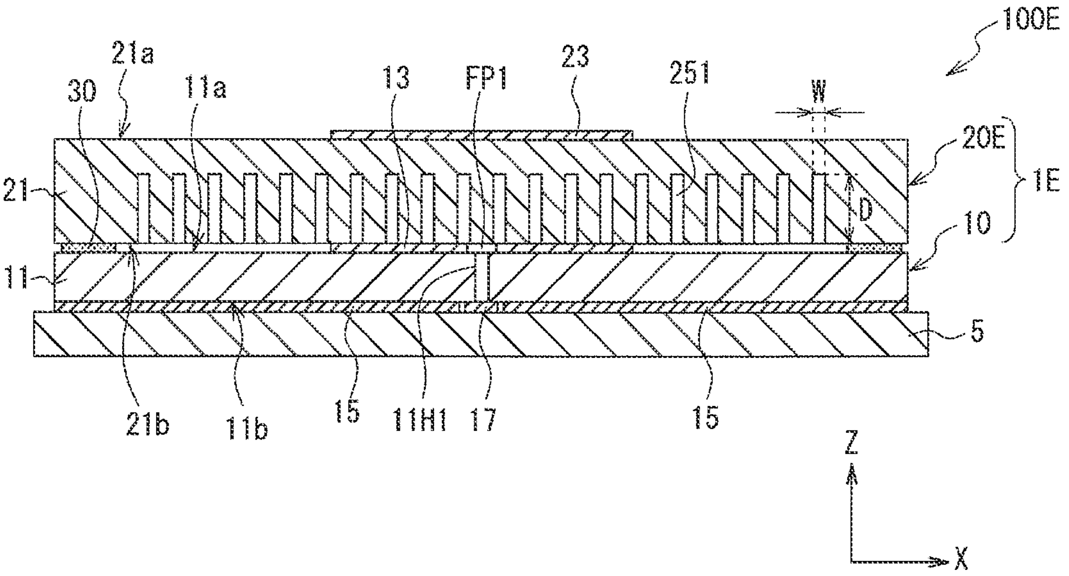
FIG. 15 is a perspective view showing a configuration example of a wireless communication apparatus according to embodiment 6 of the present disclosure.

FIG. 15 is a perspective view showing a configuration example of a wireless communication apparatus according to embodiment 6 of the present disclosure. As shown in FIG. 15, a wireless communication apparatus 100E according to embodiment 6 includes an antenna device 1E. The antenna device 1E includes a first antenna element 10 and a second antenna element 20E disposed on the side of one surface of the first antenna element 10. In the second antenna element 20E, a plurality of slits 251 (an example of the second recess as a cavity) are provided on the side of the back surface 21*b* of the second glass substrate 21. The slits 251 are formed long in the Y-axis direction. The second patch antenna 23 is located at a position where it overlaps with at least some of the plurality of slits 251 in a plan view.

The plurality of slits 251 are formed by etching the bottom surface 25*a* of the recess 25 through photolithography and wet etching techniques. For each of the plurality of slits 251, it is desirable that an aspect ratio be 3 or more and 8 or less. The aspect ratio is a ratio of a length D of the slit in the depth direction (for example, the Z-axis direction) to a length W of the slit in the width direction (for example, the X-axis direction) and is represented by D/W.

In the antenna device 1E, a cavity (for example, a plurality of slits 251) is also present between the first patch antenna 13 and the second patch antenna 23. The first patch antenna 13 faces the second patch antenna 23 via the plurality of slits 251. The dielectric constant between the first patch antenna 13 and the second patch antenna 23 is kept low by the air layer in the slits 251. Accordingly, the antenna device 1E can transmit or receive radio waves in the millimeter wave region with a high gain in a wide band.

Embodiment 7

In the above-described embodiment 1, the antenna device 1 includes one first patch antenna 13 and one second patch antenna 23. However, embodiments of the present disclosure are not limited thereto. The antenna device 1 may include a plurality of first patch antennas 13 and a plurality of second patch antennas 23.

Figure 16:
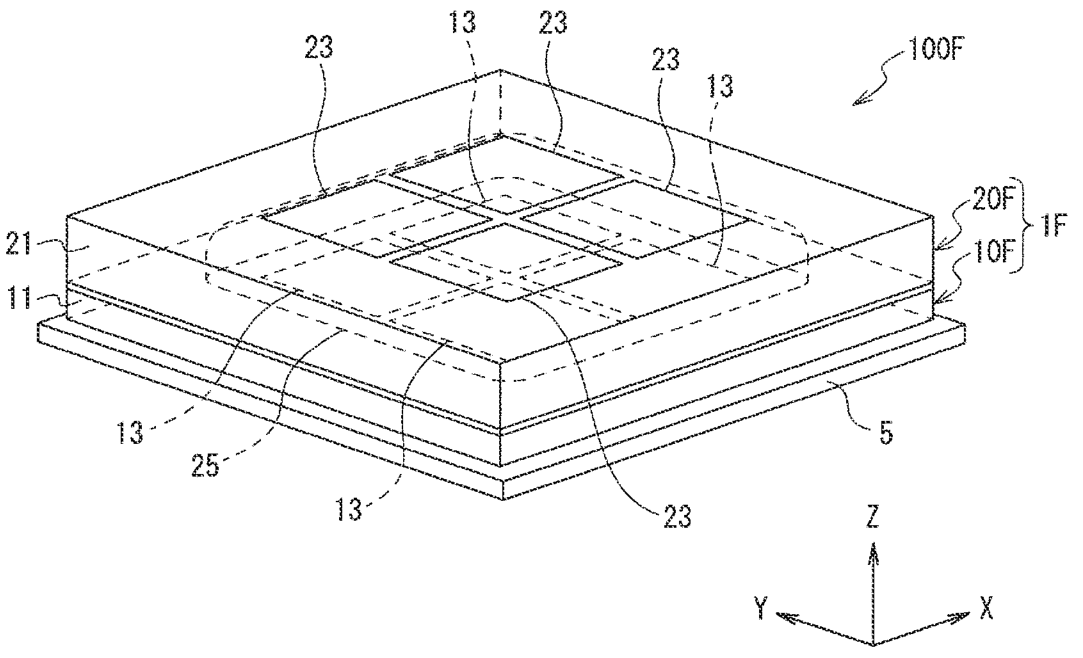
FIG. 16 is a perspective view showing a configuration example of an antenna device according to embodiment 7 of the present disclosure.

FIG. 16 is a perspective view showing a configuration example of an antenna device according to embodiment 7 of the present disclosure. As shown in FIG. 16, a wireless communication apparatus 100F according to embodiment 7 includes an antenna device 1F. The antenna device 1F includes a first antenna element 10F and a second antenna element 20F disposed on the side of one surface of the first antenna element 10.

The first antenna element 10F has a plurality of first patch antennas 13 provided on the side of the front surface of the first glass substrate 11. The second antenna element 20F has a plurality of second patch antennas 23 provided on the side of the front surface of the second glass substrate 21. The plurality of first patch antennas 13 respectively face the plurality of second patch antennas 23. Further, one recess 25 is provided in the second antenna element 20F. The plurality of first patch antennas 13 and the plurality of second patch antennas 23 are provided at positions where they overlap with the recess 25 in a plan view.

In the antenna device 1F, a cavity (for example, the recess 25) is also present between the plurality of first patch antennas 13 and the plurality of second patch antennas 23. The dielectric constant between the plurality of first patch antennas 13 and the plurality of second patch antennas 23 is kept low by the air layer in the recess 25. Accordingly, the antenna device 1F can transmit or receive radio waves in the millimeter wave region with a high gain in a wide band.

In the antenna device 1F, it is possible to transmit or receive radio waves with a narrower directivity by arranging a plurality of patch antennas having a cavity stack structure composed of the first patch antennas 13 and the second patch antennas 23. At the same time, radio waves can be superimposed and thus the antenna gain can be increased.

Embodiment 8

In embodiments of the present disclosure, the antenna device 1 may include a linear antenna (for example, a dipole antenna or a monopole antenna) in addition to the first patch antenna 13 and the second patch antenna 23.

Figure 17:
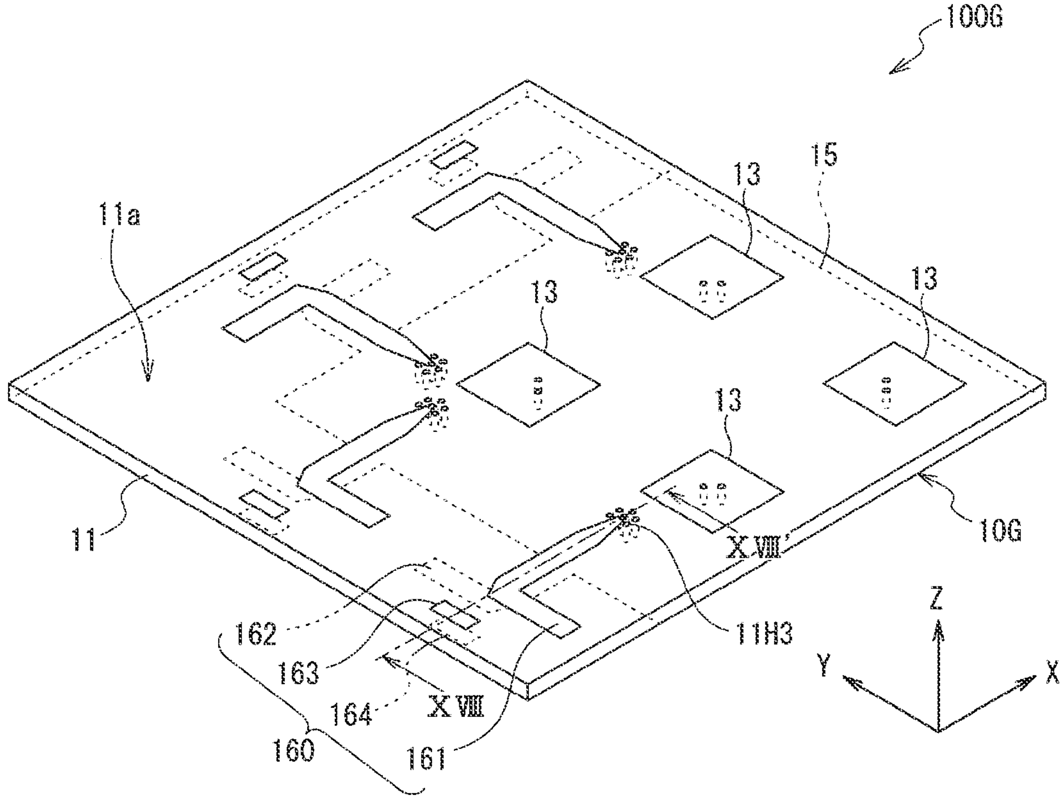
FIG. 17 is a perspective view showing a configuration example of an antenna device according to embodiment 8 of the present disclosure.
Figure 18:
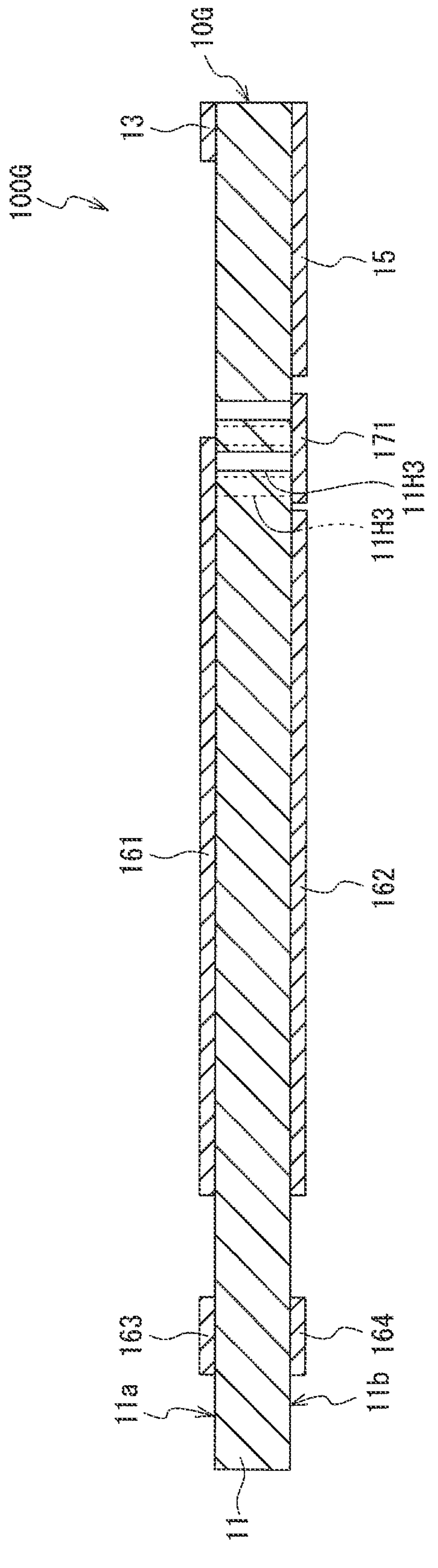
FIG. 18 is a cross-sectional view showing the configuration example of the antenna device according to embodiment 8 of the present disclosure.

FIG. 17 is a perspective view showing a configuration example of an antenna device according to embodiment 8 of the present disclosure. FIG. 18 is a cross-sectional view showing the configuration example of the antenna device according to embodiment 8 of the present disclosure. FIG. 17 shows a cross section of FIG. 17 along the X-Z plane through XVIII-XVIII' line. As shown in FIG. 17 and FIG. 18, the antenna device 1G according to embodiment 7 has a first antenna element 10G and a second antenna element 20 disposed on the side of one surface of the first antenna element 10G (refer to FIG. 1 or FIG. 2).

As shown in FIG. 17 and FIG. 18, the first antenna element 10G includes the first glass substrate 11, the first patch antenna 13 provided on the first glass substrate 11, and a dipole antenna 160 provided on the first glass substrate 11. The dipole antenna 160 includes a first conductive wire layer 161 and a third conductive wire layer 163 provided on the side of the front surface 11*a* of the first glass substrate 11, and a second conductive wire layer 162 and a fourth conductive wire layer 164 provided on the side of the back surface 11*b* of the first glass substrate 11.

In embodiment 7, the first glass substrate 11 has a third through hole 11H3 penetrating through the front surface 11*a* and the back surface 11*b* of the first glass substrate 11 and a terminal layer 171 provided on the back surface 11*b*. As shown in FIG. 18, the terminal layer 171 is not electrically connected to either the conductor layer 15 provided on the side of the back surface 11*b* or the second conductive wire layer 162.

In the first glass substrate 11, the first conductive wire layer 161 is disposed on the one side of the third through hole 11H3 and the terminal layer 171 is disposed on the other side of the third through hole 11H3. The first patch antenna 13 and the terminal layer 171 are electrically connected to each other via the third through hole 11H3. The third through hole 11H3 may be filled with a conductor. An example of the conductor is Cu or a Cu alloy.

The first conductive wire layer 161, the terminal layer 171, and the second conductive wire layer 162 are connected to the phase shifter 55 (refer to FIG. 9) of the wireless communication circuit 50, for example, via a signal line provided on the communication circuit board 5. Alternatively, the second conductive wire layer 162 may be fixed to an arbitrary potential (for example, a ground potential (0 V)) via a potential line provided on the communication circuit board 5. The third conductive wire layer 163 and the fourth conductive wire layer 164 are not electrically connected to any component.

The first conductive wire layer 161 and the third conductive wire layer 163 are formed at the same time as the first patch antenna 13 through the same process, for example. As a result, the first conductive wire layer 161 and the third conductive wire layer 163 are formed of the same material (for example, Cu or a Cu alloy) and have the same film thickness as the first patch antenna 13.

Similarly, the second conductive wire layer 162, the fourth conductive wire layer 164, and the terminal layer 171 are formed at the same time as the conductor layer 15 and the terminal layer 17 through the same process, for example. As a result, the second conductive wire layer 162, the fourth conductive wire layer 164, and the terminal layer 171 are formed of the same material (as an example, Cu or Cu alloy) and have the same film thickness as the conductor layer 15 and the terminal layer 17.

The dipole antenna 160 has a directivity in the horizontal direction (for example, the X-axis direction or the Y-axis direction) parallel to the first patch antenna 13. As a result, the antenna device 1G can transmit radio waves in the millimeter wave region in the horizontal direction and receive radio waves in the millimeter wave region in the horizontal direction through the dipole antenna 160. The antenna device 1G has a directivity not only in the normal direction of the first patch antenna 13 but also in the horizontal direction of the first patch antenna 13 and thus can cover a wider area.

Embodiment 9

Figure 19:
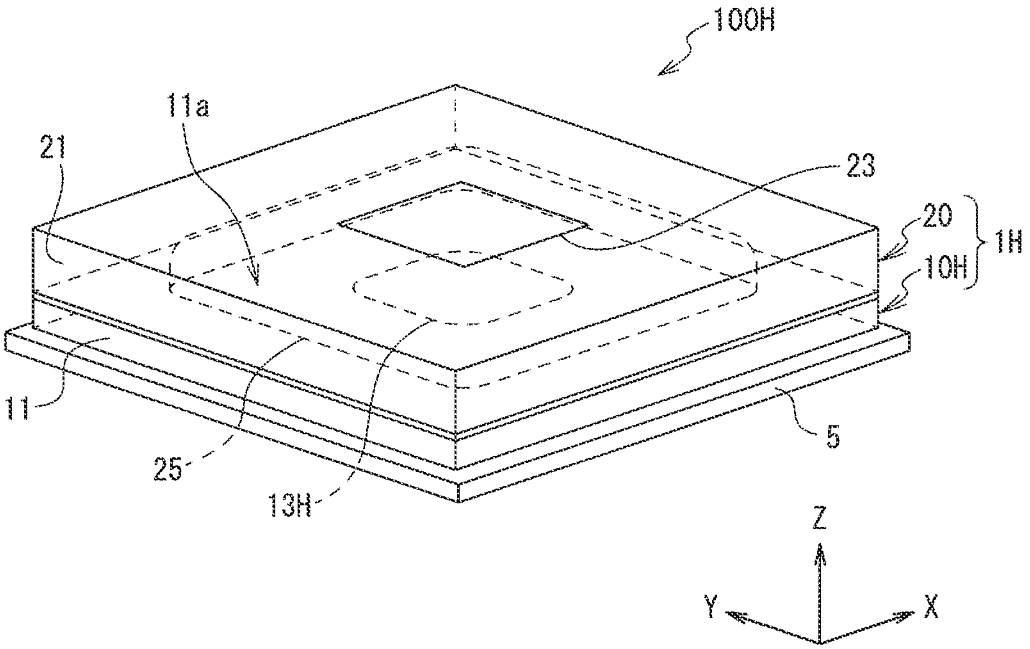
FIG. 19 is a perspective view showing a configuration example of a wireless communication apparatus according to embodiment 9 of the present disclosure.

FIG. 19 is a perspective view showing a configuration example of a wireless communication apparatus according to embodiment 9 of the present disclosure. As shown in FIG. 19, a wireless communication apparatus 100H according to embodiment 9 includes an antenna device 1H and the wireless communication circuit 50 (refer to FIG. 9) connected to the antenna device 1H. The antenna device 1H includes a first antenna element 10H and the second antenna element 20 disposed on the side of one surface of the first antenna element 10H.

The first antenna element 10H has a plurality of first patch antennas 13H provided on the side of the front surface 11*a* of the first glass substrate 11. The first patch antennas 13H face the second patch antenna 23 of the second antenna element 20. The only difference between the first patch antennas 13H shown in FIG. 19 and the first patch antenna 13 described in embodiment 1 and the like is the shape of the corners. In the first patch antennas 13H shown in FIG. 19, the configuration other than the shape of the corners is the same as that of the first patch antenna 13.

Figure 20:
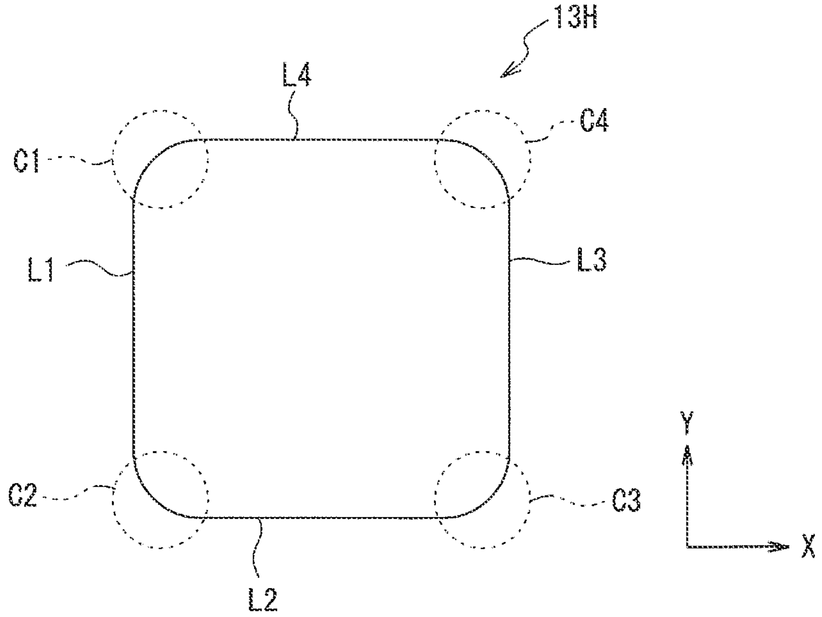
FIG. 20 is a plan view showing configuration example 1 of a first patch antenna according to embodiment 9 of the present disclosure.

FIG. 20 is a plan view showing a configuration example 1 of the first patch antenna according to embodiment 9 of the present disclosure. As shown in FIG. 20, the shape of the first patch antenna 13H in a plan view is rectangular. The first patch antenna 13H has a first edge L1, a second edge L2, a third edge L3, and a fourth edge L4 as outer circumferential edges. The first edge L1 and the third edge are parallel in the Y-axis direction, and the second edge L2 and the fourth edge L4 are parallel in the Y-axis direction. The first edge L1 and the third edge L3 face each other in the X-axis direction, and the second edge L2 and the fourth edge L4 face each other in the Y-axis direction.

One end of the first edge L1 and one end of the fourth edge L4 are connected at C1. The other end of the first edge L1 and one end of the second edge L2 are connected at a corner C2. The other end of the second edge L2 and one end of the third edge L3 are connected at a corner C3. The other end of the third edge L3 and the other end of the fourth edge L4 are connected at a corner C4.

In the first patch antenna 13H, one or more contours of the corners C1 to C4 have a shape including a curve in a plan view. A contour may also be called an outer edge. For example, as shown in FIG. 20, the contours of the corners C1 to C4 have a shape including a curve in a plan view. The contour of the corner C1 is a curved line drawing an arc and is rounded. Similarly, each of the contours of the corners C2 to C4 is a curved line drawing an arc and is rounded. As a result, electric field concentration on the corners C1 to C4 can be curbed and thus an excitation shape of the first patch antenna 13H can be curbed from collapsing.

Alternatively, one or more contours of the corners C1 to C4 may have a shape including a plurality of obtuse angles (angles greater than 90° and less than) 180° in a plan view.

Figure 21:
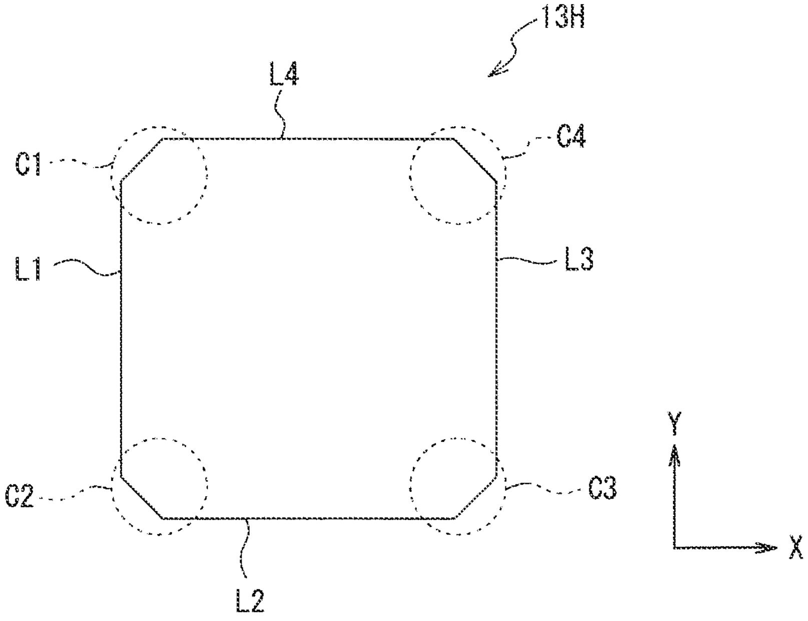
FIG. 21 is a plan view showing configuration example 2 of the first patch antenna according to embodiment 9 of the present disclosure.
Figure 22:
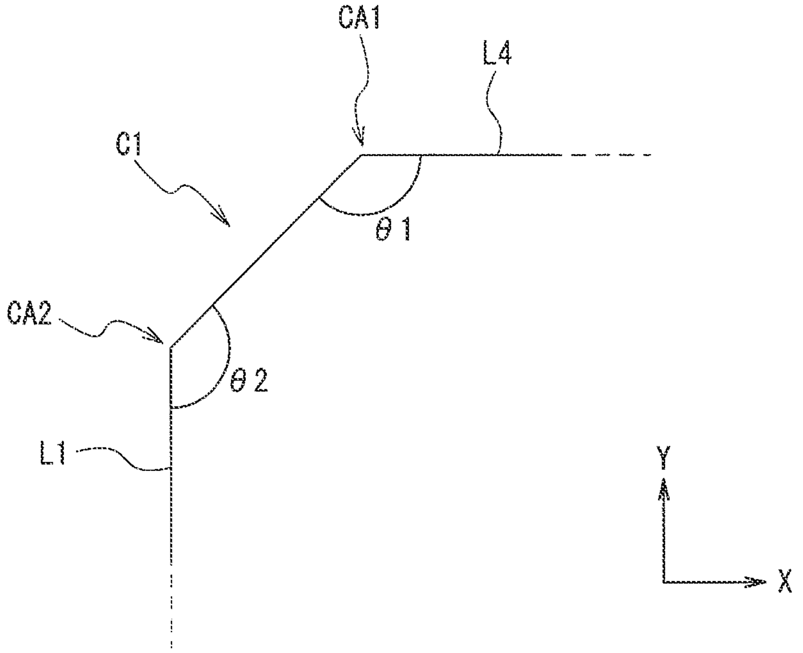
FIG. 22 is a plan view showing configuration example 1 of a corner according to embodiment 9.

FIG. 21 is a plan view showing a configuration example 2 of the first patch antenna according to embodiment 9 of the present disclosure. FIG. 22 is a plan view showing a configuration example 1 of the corner according to embodiment 9. For example, as shown in FIG. 21 and FIG. 22, the contour of the corner C1 has a shape including two obtuse angles CA1 and CA2 in a plan view. The angle θ1 of the obtuse angle CA1 and the angle θ2 of the obtuse angle CA2 are greater than 90° and less than 180. As an example, the angles θ1 and θ2 are 135°.

Similarly, each of the contours of the corners C2 to C4 also has a shape including two obtuse angles CA1 and CA2 in a plan view. As a result, electric field concentration on the corners C1 to C4 can be curbed and thus an excitation shape of the first patch antenna 13H can be curbed from collapsing.

FIG. 22 shows a case where each of the contours of the corners C1 to C4 has a shape including two obtuse angles CA1 and CA2 in a plan view. However, the shapes of the corners C1 to C4 are not limited thereto. Each of the contours of the corners C1 to C4 may have a shape including three or more obtuse angles in a plan view.

Figure 23:
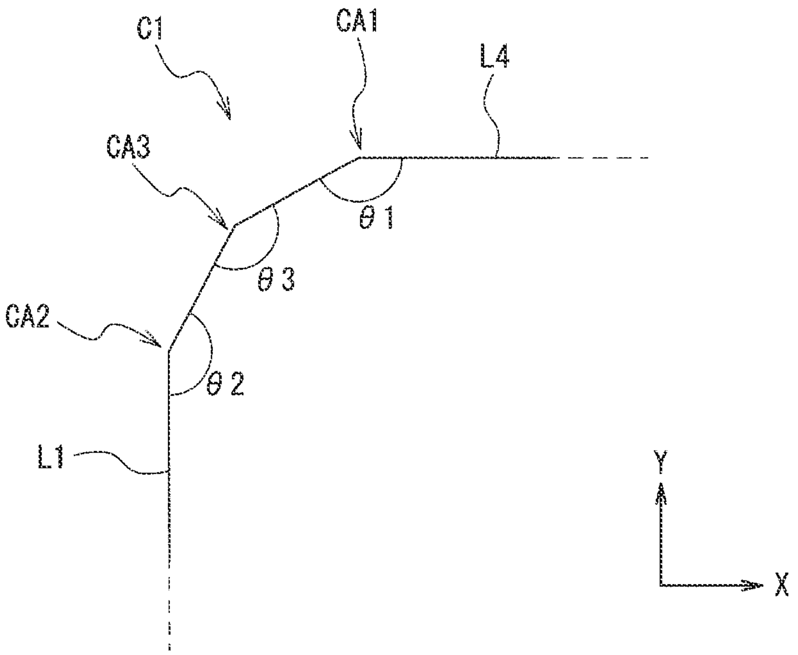
FIG. 23 is a plan view showing configuration example 2 of a corner according to embodiment 9.

FIG. 23 is a plan view showing a configuration example 2 of the corner according to embodiment 9. The contour of the corner C1 has a shape including three obtuse angles CA1, CA3, and CA2 in a plan view. The obtuse angle CA3 is disposed between the two obtuse angles CA1 and CA2. The obtuse angles CA1, CA3, and CA2 are disposed such that they are connected in this order. The angle θ1 of the obtuse angle CA1, the angle θ2 of the obtuse angle CA2, and the angle θ3 of the obtuse angle CA3 are greater than 90° and less than 180. As an example, the angles θ1, θ2, and θ3 are 150°.

Similarly, each of the contours of the corners C2 to C4 also has a shape including three obtuse angles CA1, CA3, and CA2 in a plan view. It is desirable that the number of obtuse angles be larger in each of the corners C1 to C4. The larger the number of obtuse angles, the wider the obtuse angles and the closer the obtuse angles are disposed. As a result, each of the corners C1 to C4 approaches a shape including a curve as shown in FIG. 21, and thus the effect of curbing electric field concentration can be expected to be improved.

Modified Example

In embodiments of the present disclosure, not only the first patch antenna but also the second patch antenna may include at least one corner thereof having a shape including a curved line or a plurality of obtuse angles in a plan view.

Figure 24:
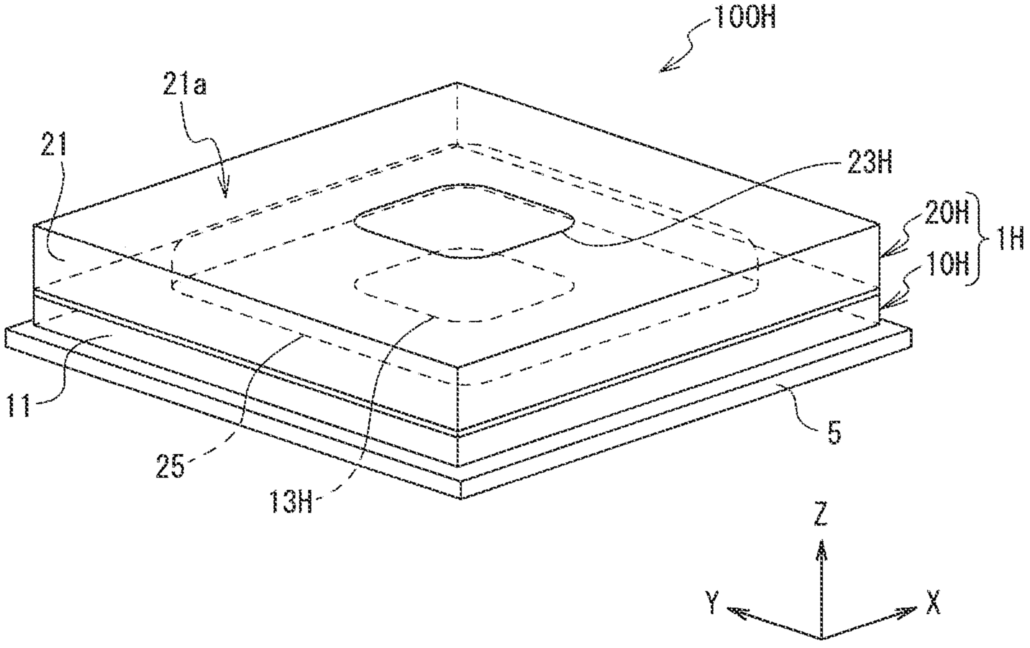
FIG. 24 is a perspective view showing modified example 1 of the wireless communication apparatus according to embodiment 9 of the present disclosure.

FIG. 24 is a perspective view showing a modified example 1 of the wireless communication apparatus according to embodiment 9 of the present disclosure. As shown in FIG. 24, in this modified example 1, a second antenna element 20H is disposed on the side of one surface of the first antenna element 10H. The second antenna element 20H has the second glass substrate 21 and a second patch antenna 23H provided on the side of the front surface 21*a* of the second glass substrate 21. The second patch antenna 23H faces the first patch antenna 13H of the first antenna element 10H. The only difference between the second patch antenna 23H and the second patch antenna 23 described in embodiment 1 and the like is the shape of the corners. The configuration of the second patch antenna 23H other than the shape of the corners is the same as that of the second patch antenna 23.

Similarly to the first patch antenna 13H, the second patch antenna 23H includes at least one corner thereof having a shape including a curved line or a shape including a plurality of obtuse angles in a plan view. For example, the second patch antenna 23H has the same shape and the same dimensions as those of the first patch antenna 13H. Accordingly, electric field concentration on the corners can be curbed in the second patch antenna 23H as well as the first patch antenna 13H. Therefore, it is possible to curb collapse of the excitation shape in each of the first patch antenna 13H and the second patch antenna 23H.

Further, in embodiments of the present disclosure, only the corners of the second patch antenna, not the first patch antenna, may have a shape including a curved line or a shape including a plurality of obtuse angles in a plan view.

Figure 25:
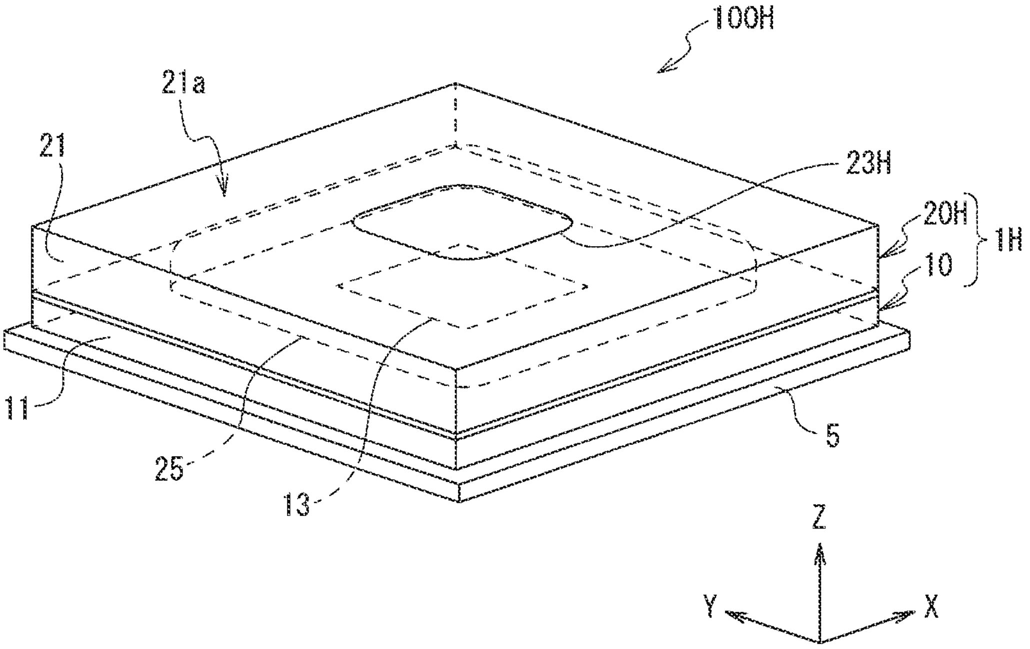
FIG. 25 is a perspective view showing modified example 2 of the wireless communication apparatus according to embodiment 9 of the present disclosure.

FIG. 25 is a perspective view showing a modified example 2 of the wireless communication apparatus according to embodiment 9 of the present disclosure. As shown in FIG. 25, in this modified example 2, the second antenna element 20H is disposed on the side of one surface of the first antenna element 10. The second patch antenna 23H of the second antenna element 20H faces the first patch antenna 13H of the first antenna element 10H. Even in such a configuration, it is possible to curb collapse of the excitation shape of the second patch antenna 23H.

Embodiment 10

Figure 26:
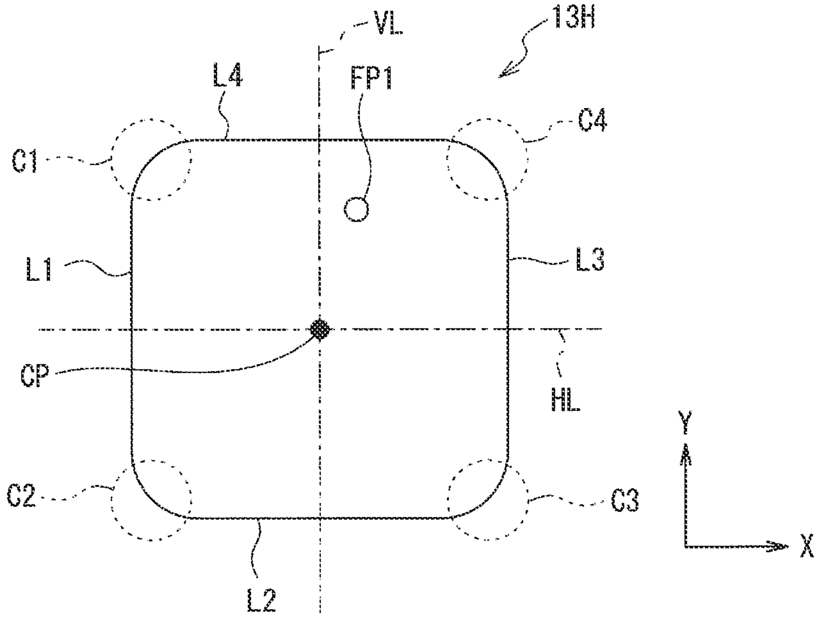
FIG. 26 is a plan view showing an arrangement example of a first feeding point according to embodiment 10 of the present disclosure.

FIG. 26 is a plan view showing an arrangement example of the first feeding point according to embodiment 10 of the present disclosure. As shown in FIG. 26, the first feeding point FP1 is connected to, for example, the vicinity of the fourth edge L4 of the first patch antenna 13H. With this structure, the first patch antenna 13H transmits or receives a single-polarized signal according to excitation of the circumference of the fourth edge L4 and the circumference of the second edge L2 thereof.

In the example shown in FIG. 26, the first patch antenna 13H is used. Since the corners C1 to C4 of the first patch antenna 13H are rounded, electric field concentration on the corners C1 to C4 is curbed.

Further, the shape of the first patch antenna 13H in a plan view is a rectangle. In this rectangle, a straight line connecting the centers of a set of edges (for example, the fourth edge CL4 and the second edge L2) facing each other in a first direction (for example, the Y-axis direction) is defined as a first straight line VL. A straight line connecting the centers of a set of edges (for example, the first edge CL1 and the third edge L3) facing each other in a second direction (for example, the X-axis direction) intersecting the first direction is defined as a second straight line HL. As shown in FIG. 26, the first feeding point FP1 is located at a position separated from the first straight line VL and the second straight line HL.

The position where the first straight line VL intersects the second straight line HL is the center position CP of the first patch antenna 13H. The first feeding point FP1 is located at a position deviated from the center position CP in two axial directions (X-axis direction and Y-axis direction). For example, the first feeding point FP1 is separated from the first straight line VL and the second straight line HL by 0.05 mm or more, respectively. This improves an excitation state when the first patch antenna 13H transmits or receives a single-polarized signal. In an antenna device that transmits or receives a single-polarized signal, the depth of resonance and the band can be improved and the band can be widened.

Figure 27:
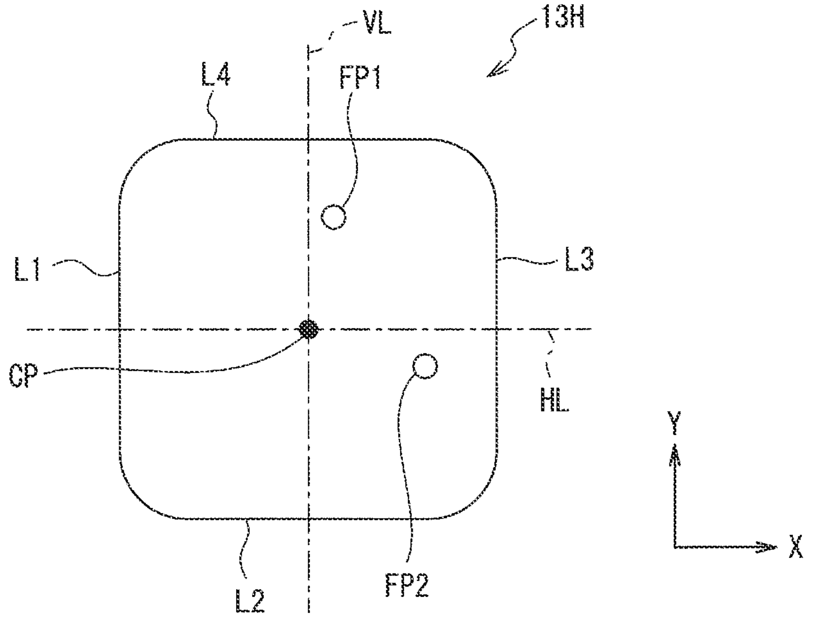
FIG. 27 is a plan view showing an arrangement example of the first feeding point and a second feeding point according to embodiment 10 of the present disclosure.

FIG. 27 is a plan view showing an arrangement example of the first feeding point and the second feeding point according to embodiment 10 of the present disclosure. As shown in FIG. 27, the first feeding point FP1 is connected to, for example, the vicinity of the fourth edge L4 of the first patch antenna 13H. The second feeding point FP2 is connected to, for example, the vicinity of the third edge L3 of the first patch antenna 13H.

With this structure, the first patch antenna 13H transmits or receives a signal polarized in one of the vertical direction and the horizontal direction according to excitation of the circumference of the fourth edge L4 and the circumference of the second edge L2. Further, the first patch antenna 13H transmits or receives a signal polarized in the other of the vertical direction and the horizontal direction according to excitation of the circumference of the third edge L3 and the circumference of the first edge L1. That is, the first patch antenna 13H transmits or receives a bipolarized signal.

In the example shown in FIG. 27, the first patch antenna 13H is also used. Since the corners C1 to C4 of the first patch antenna 13H are rounded, electric field concentration on the corners C1 to C4 is curbed.

Further, as shown in FIG. 27, the first feeding point FP1 is located at a position separated from the first straight line VL and the second straight line HL. The second feeding point FP2 is also located at a position separated from the first straight line VL and the second straight line HL. For example, the second feeding point FP2 is separated from the first straight line VL and the second straight line HL by 0.05 mm or more. That is, each of the first feeding point FP1 and the second feeding point FP2 is located at a position deviated from the center position CP in two axis-direction (the X-axis direction and the Y-axis direction). This improves the excitation state when the first patch antenna 13H transmits or receives a dual-polarized signal. In an antenna device that transmits or receives a dual-polarized signal, the depth of resonance and the band can be improved and the band can be widened.

Embodiment 11

Figure 28:
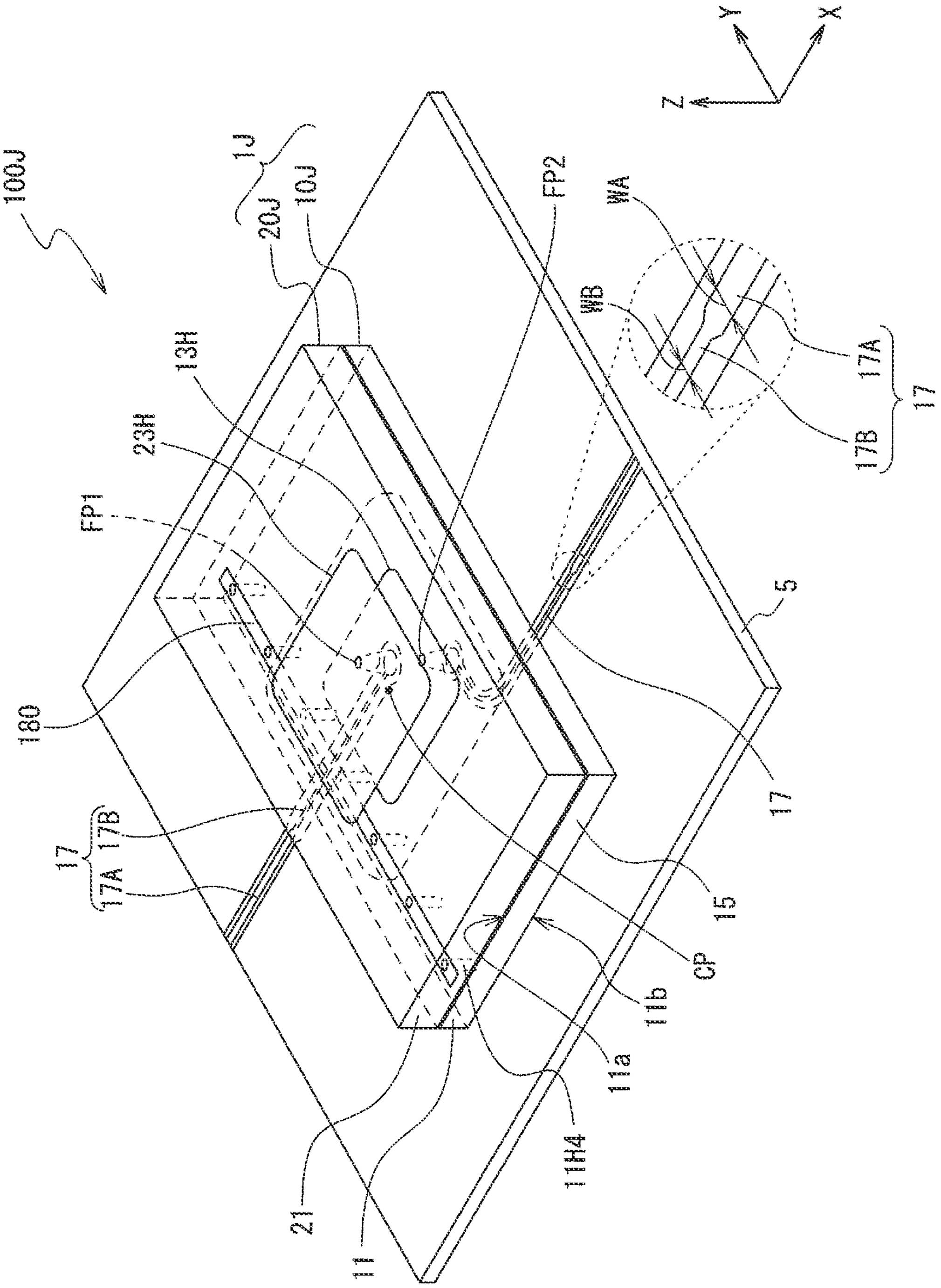
FIG. 28 is a perspective view showing a configuration example of a wireless communication apparatus according to embodiment 11 of the present disclosure.

FIG. 28 is a perspective view showing a configuration example of a wireless communication apparatus according to embodiment 11 of the present disclosure. As shown in FIG. 28, a wireless communication apparatus 100J according to embodiment 11 includes an antenna device 1J and the communication circuit board 5 on which the antenna device 1J is mounted. The antenna device 1J has an elongated shape in one direction. For example, the antenna device 1J has a first antenna element 10J and a second antenna element 20J. The dimensions of the first antenna element 10J and the second antenna element 20J are longer in the Y-axis direction than in the X-axis direction.

Even in such a case, the antenna device 1J includes at least one of the first patch antenna 13H and the second patch antenna 23H having corners in a shape including a curved line (or a shape including a plurality of obtuse angles), and thus the excitation shape can be curbed from collapsing. Further, in the antenna device 1J, at least one of the first feeding point FP1 and the second feeding point FP2 is present at a position where it is deviated with respect to the center position CP in two axial directions (the X-axis direction and the Y-axis direction), and thus the depth of resonance and the band can be improved and the band can be widened.

Further, as shown in FIG. 28, it is desirable that the antenna device 1J elongated in one direction have a metal plate 180 elongated in one direction and disposed away from the first patch antenna 13. FIG. 28 illustrates a case where the antenna device 1J and the metal plate 180 are elongated in the Y-axis direction.

The metal plate 180 is provided on the side of the front surface 11*a* of the first glass substrate 11 like the first patch antenna 13. The metal plate 180 has the same layer structure as that of the first patch antenna 13. For example, the metal plate 180 is composed of a Cu layer formed through electroplating, a Ni layer formed through electroless plating, and an Au layer formed through electroless plating. The Cu layer, the Ni layer and the Au layer are laminated in this order from the side of the first glass substrate 11. The metal plate 180 is formed at the same time as the first patch antenna 13 through the same process.

A plurality of fourth through holes 11H4 penetrating through the front surface 11*a* and the back surface 11*b* of the first glass substrate 11 are provided in the first glass substrate 11 of the antenna device 1J. The metal plate 180 is disposed on the side of one end of the fourth through holes 11H4, and the conductor layer 15 is disposed on the side of the other end of the fourth through holes 11H4. The fourth through holes 11H4 may be filled with a conductor. An example of the conductor is Cu or a Cu alloy.

The metal plate 180 is electrically connected to the conductor layer 15 via the fourth through holes 11H4. When the conductor layer 15 is a ground and serves as a reflective layer, the metal plate 180 is connected to the conductor layer 15 via the fourth through holes 11H4. The conductor layer 15 is fixed to an arbitrary potential (for example, a ground potential (0 V)). As a result, the antenna device 1J can improve a radiation shape of transmitted radio waves.

Further, as shown in FIG. 28, the terminal layer 17 is provided on the communication circuit board 5 as a feeding transmission line for feeding power to the first feeding point FP1 and the second feeding point FP2. The terminal layer 17 may have at least two or more wiring widths. For example, the terminal layer 17 has a first wiring portion 17A having a first wiring width WA and a second wiring portion 17B connected in series to the first wiring portion 17A and having a second wiring width WB. The value of the second wiring width WB is less than that of the first wiring width WA. In the communication circuit board 5, in order to optimize matching of the impedance of a signal input to the antenna device 1J, lines (the first wiring portion 17A and the second wiring portion 17B) having different widths are combined.

Figure 29A:
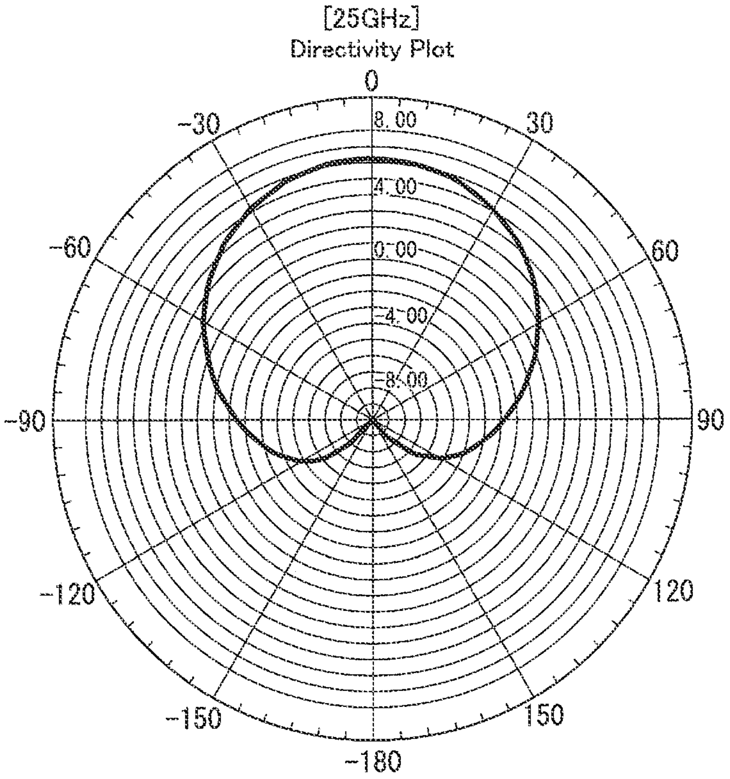
FIG. 29A is a graph showing a result of evaluation of the antenna directivity of an antenna device according to an embodiment of the present disclosure.
Figure 29B:
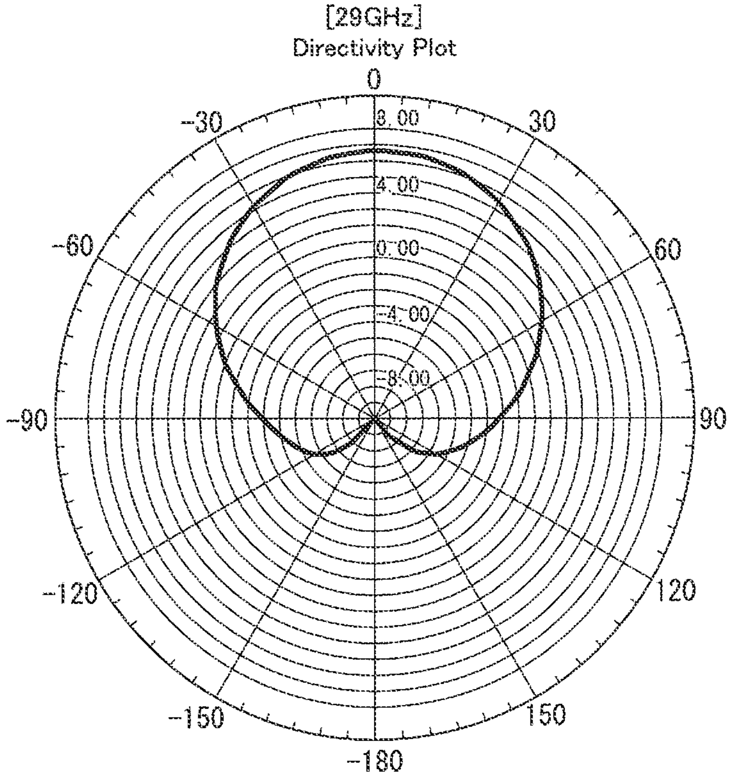
FIG. 29B is a graph showing a result of evaluation of the antenna directivity of the antenna device according to the embodiment of the present disclosure.
Figure 29C:
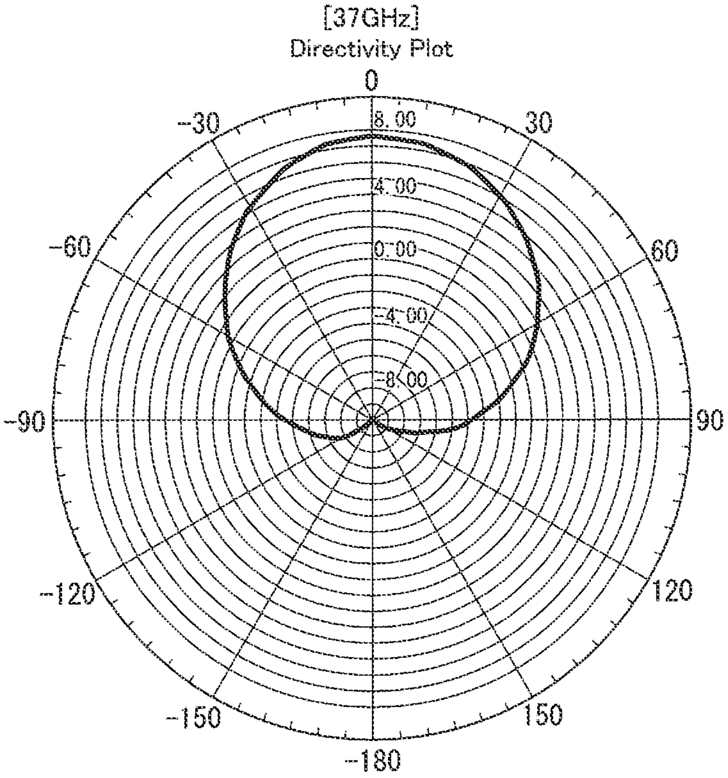
FIG. 29C is a graph showing a result of evaluation of the antenna directivity of the antenna device according to the embodiment of the present disclosure.
Figure 29D:
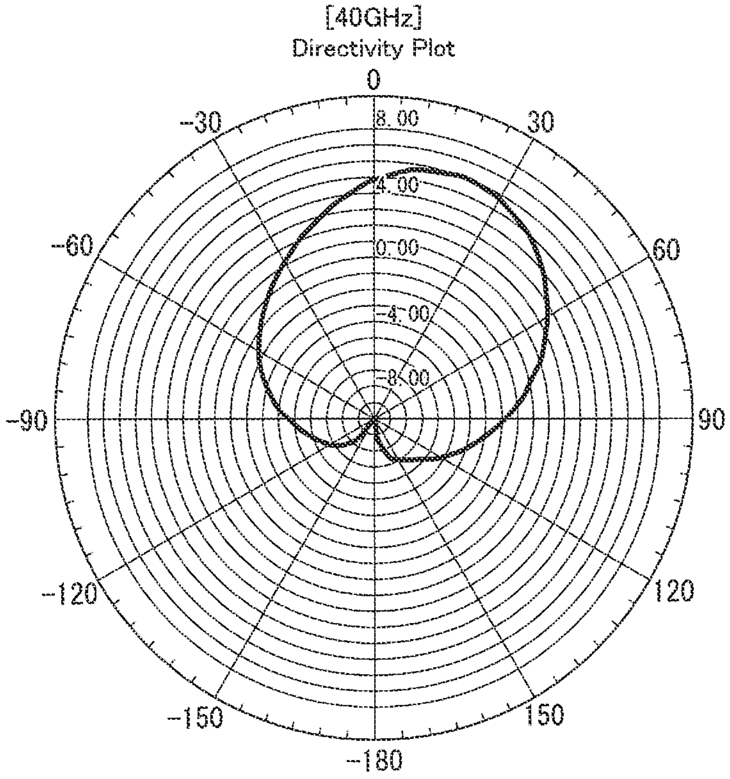
FIG. 29D is a graph showing a result of evaluation of the antenna directivity of the antenna device according to the embodiment of the present disclosure.
Figure 29E:
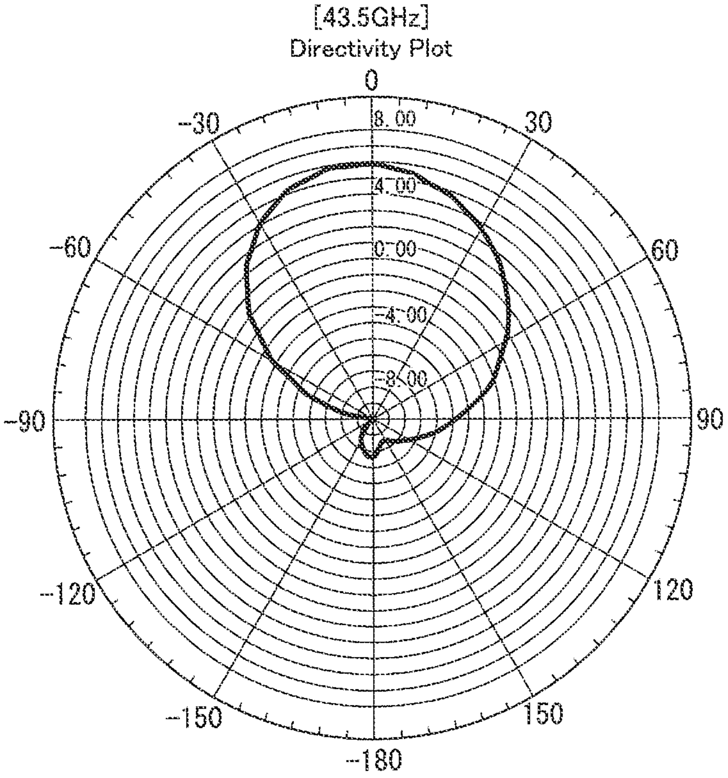
FIG. 29E is a graph showing a result of evaluation of the antenna directivity of the antenna device according to the embodiment of the present disclosure.

(Evaluation results) FIGS. 29A, 29B, 29C, 29D, and 29E are graphs showing results of evaluation of antenna directivity of an antenna device according to the embodiments of the present disclosure. More specifically, FIG. 29A is a graph showing a result of evaluation of antenna directivity when a radio wave frequency is 25 GHz. FIG. 29B is a graph showing the result of evaluating antenna directivity when the frequency of the radio wave is 29 GHz. FIG. 29C is a graph showing a result of evaluation of antenna directivity when the radio wave frequency is 37 GHz. FIG. 29D is a graph showing a result of evaluation of antenna directivity when the radio wave frequency is 40 GHz. FIG. 29E is a graph showing a result of evaluation of antenna directivity when the radio wave frequency is 43.5 GHZ.

In each of FIGS. 29A, 29B, 29C, 29D, and 29E, numerical values attached to the outer circumference of the circle indicate angles (°) of the second patch antenna 23H in the normal direction. Further, numerical values attached to the inside of the circle indicate gains (dB). In these figures, a maximum gain is standardized as 10 dB.

This evaluation was performed using an antenna device having the two configurations described in the embodiments 9 and 10. Specifically, the antenna device used for the evaluation includes the first patch antenna 13H and the second patch antenna 23H. Both the first patch antenna 13H and the second patch antenna 23H have a rectangular shape in a plan view, and the four corners of the rectangle are curved and rounded (configuration 1). Further, the antenna device used for the evaluation has the first feeding point FP1 and the second feeding point FP2. The first feeding point FP1 and the second feeding point FP2 are respectively displaced in two axial directions (configuration 2).

As shown in FIGS. 29A, 29B, 29C, 29D, and 29E, it is confirmed that the antenna device having the configurations 1 and 2 can realize improvement of radiation characteristic and improvement of a gain in a wide frequency band from 25 GHz to 43.5 GHz.

In general, when radio waves in a wide band are transmitted or received, patch antennas having a plurality of sizes are prepared corresponding to a plurality of bands. For a higher frequency, a smaller patch antenna is designed. However, if patch antennas having a plurality of sizes are prepared, the number of parts increases, which hinders miniaturization of the device and increases the manufacturing cost. In order to prevent this, it is conceivable to handle wide band radio waves with a common patch antenna having one size, but in this case, electric fields tend to concentrate on the corners of the patch antenna, particularly, at the time of transmitting or receiving high frequencies. When electric fields concentrate on the corners of the patch antenna, the excitation shape may collapse to cause deterioration of radiation characteristics of radio waves and the gain.

However, it is confirmed that the antenna device having the configurations 1 and 2 curbs electric field concentration on the corners even at the time of transmitting or receiving high-frequency radio waves (for example, 43.5 GGz) and thus curb the excitation shape from collapsing as compared to a device without the configurations 1 and 2. It is confirmed that a decrease in radiation characteristics and a decrease in the gain are curbed even at the time of transmitting or receiving high-frequency radio waves (for example, 43.5 GGz). From these results, it is confirmed that the antenna device having the configurations 1 and 2 can widen the band as compared to a device without the configurations 1 and 2.

OTHER EMBODIMENTS

As mentioned above, the present disclosure has been described by embodiments and modified examples, but the statement and drawings that form part of this disclosure should not be understood to limit the present disclosure. It is to be understood that various alternative embodiments, examples, and operable techniques will become apparent from this disclosure to those skilled in the art.

For example, in the embodiments of the present disclosure, a mobile device, an automobile, and building parts may be provided with any one or more of the above-mentioned antenna devices 1, 1A to 1J. When a mobile device includes any one or more of the antenna devices 1, 1A to 1J, the second glass substrate 21 may be used as a part of a display panel of the mobile device. As a result, it is possible to provide a mobile device capable of transmitting and receiving radio waves in the millimeter wave region in a wide band.

When an automobile is equipped with any one or more of the antenna devices 1, 1A to 1J, the second glass substrate 21 may be used as a part of the windshield or the rear glass of the automobile. As a result, it is possible to provide an automobile having a transmission function capable of transmitting and receiving radio waves in the millimeter wave region in a wide band.

When building parts include any one or more of the antenna devices 1, 1A to 1J, the second glass substrate 21 may be used a part of the building parts. Examples of building parts include glass windows. As a result, it is possible to provide building parts capable of transmitting and receiving radio waves in the millimeter wave region in a wide band.

In this manner, the present technology obviously includes various embodiments and the like that are not described herein. At least one of various omissions, substitutions and modifications of components may be performed without departing from the gist of the embodiments and the modified examples described above. Further, the effects described in the present specification are merely exemplary and not limited, and other effects may be obtained.

Meanwhile, the present disclosure can also take the following configurations.

(1) An antenna device including a first antenna element, and
a second antenna element disposed on the side of one surface of the first antenna element,
wherein the first antenna element includes a first glass substrate, and
a first patch antenna provided on the first glass substrate, and
the second antenna element includes
a second glass substrate, and
a second patch antenna provided on the second glass substrate,
wherein a shape of at least one of the first patch antenna and the second patch antenna in a plan view is a rectangle, and
contours of one or more of four corners of the rectangle include a curved line or a plurality of obtuse angles in a plan view.

(2) The antenna device according to (1), wherein the first antenna element includes
a first feeding point to connect to the first patch antenna,
a shape of the first patch antenna in a plan view is a rectangle, and
when a straight line connecting centers of a pair of edges facing each other in a first direction is defined as a first straight line and a straight line connecting centers of a pair of edges facing each other in a second direction intersecting the first direction is defined as a second straight line in the rectangle,
the first feeding point is located at a position separated from the first straight line and the second straight line.

(3) The antenna device according to (2), wherein the first feeding point is separated from the first straight line and the second straight line by 0.05 mm or more.

(4) The antenna device according to (2) or (3), further including a feeding transmission line connected to the first feeding point,
wherein the feeding transmission line includes
a first wiring portion, and
a second wiring portion connected in series to the first wiring portion and having a wiring width different from a wiring width of the first wiring portion.

(5) The antenna device according to any one of (2) to (4), wherein the first antenna element further includes
a second feeding point connected to the first patch antenna at a position separated from the first feeding point.

(6) The antenna device according to (5), wherein the second feeding point is separated from the first straight line and the second straight line by 0.05 mm or more.

(7) The antenna device according to (5) or (6), wherein the first feeding point and the second feeding point are connected to impedances having the same magnitude.

(8)

The antenna device according to any one of (1) to (7), further including a metal plate provided on the same surface as the surface of the first glass substrate on which the first patch antenna is provided and disposed away from the first patch antenna, wherein the metal plate is fixed to an arbitrary potential.

(9) The antenna device according to any one of (1) to (8), wherein at least a part of the first patch antenna faces the second patch antenna through a cavity.

(10) The antenna device according to (9), wherein the first glass substrate includes a first recess, as the cavity, provided on the side of the surface facing the second glass substrate, and the first patch antenna is provided on a bottom surface of the first recess.

(11) The antenna device according to (10), wherein a boundary between an inner surface of the first recess and the bottom surface of the first recess is rounded.

(12) The antenna device according to any one of (9) to (11), wherein the second glass substrate includes a second recess, as the cavity, opened on the side of the surface facing the first glass substrate, and the second patch antenna is provided on the opposite side of a bottom surface of the second recess.

(13) The antenna device according to (12), wherein the second glass substrate has protrusions provided on the bottom surface of the second recess.

(14) The antenna device according to (12) or (13), wherein a boundary between an inner surface of the second recess and a bottom surface of the second recess is rounded.

(15) The antenna device according to (12), including a plurality of second recesses, wherein an aspect ratio of the plurality of second recesses is 3 or more and 8 or less.

(16) The antenna device according to any one of (1) to (15), including a conductor layer provided on the opposite side of the first patch antenna with the first glass substrate interposed therebetween and fixed to an arbitrary potential.

(17) The antenna device according to any one of (1) to (16), wherein the first glass substrate and the second glass substrate have transmittance.

(18) The antenna device according to (17), wherein the first antenna element includes a first alignment mark provided on the first glass substrate, the second antenna element includes a second alignment mark provided on the second glass substrate, and the first alignment mark and the second alignment mark overlap in a plan view.

(19) The antenna device according to any one of (1) to (18), wherein a thickness of the first glass substrate and a thickness of the second glass substrate are 0.3 mm or more and 1.0 mm or less.

(20) The antenna device according to any one of (1) to (19), wherein the first antenna element includes a linear antenna provided on the first glass substrate.

(21) An antenna device including a first antenna element, and a second antenna element disposed on the side of one surface of the first antenna element, wherein the first antenna element includes a first glass substrate, and a first patch antenna provided on the first glass substrate, and the second antenna element includes a second glass substrate, and a second patch antenna provided on the second glass substrate, wherein the first antenna element includes a first feeding point to connect to the first patch antenna, a shape of the first patch antenna in a plan view is a rectangle, and when a straight line connecting centers of a pair of edges facing each other in a first direction is defined as a first straight line and a straight line connecting centers of a pair of edges facing each other in a second direction intersecting the first direction is defined as a second straight line in the rectangle, the first feeding point is located at a position separated from the first straight line and the second straight line.

(22) A wireless communication apparatus including an antenna device, and a wireless communication circuit connected to the antenna device, wherein the antenna device includes a first antenna element, and a second antenna element disposed on the side of one surface of the first antenna element, wherein the first antenna element includes a first glass substrate, and a first patch antenna provided on the first glass substrate, and the second antenna element includes a second glass substrate, and a second patch antenna provided on the second glass substrate, wherein a shape of at least one of the first patch antenna and the second patch antenna in a plan view is a rectangle, and contours of one or more of four corners of the rectangle include a curved line or a plurality of obtuse angles in a plan view.

REFERENCE SIGNS LIST

1, 1A, 1B, 1C, 1D, 1E, 1F, 1G, 1H, 1J Antenna device
5 Communication circuit board
10, 10A, 10B, 10C, 10D-10F, 10G, 10H, 10J First antenna element
11 First glass substrate
11*a*, 21*a* Front surface
11*b*, 21*b* Back surface
11H1 First through hole
11H2 Second through hole
11H3 Third through hole
11H4 Fourth through hole
12*a* Bottom surface
13, 13H First patch antenna
13A, 15A, 17A, 18A Cu layer
13B, 15B, 17B, 18B Ni layer
13C, 15C, 17C, 18C Au layer
15 Conductor layer
17 Terminal layer
17A First wiring portion
17B Second wiring portion

18 Connection layer
19*a*, 19*b*, 29 Copper
20, 20A, 20B, 20D, 20E, 20F, 20H, 20J Second antenna element
21 Second glass substrate
23, 23H Second patch antenna
25, 111 Recess
25*a*, 111*a* Bottom surface
25*b*, 111*b* Inner surface
25*c*, 111*c* Boundary
30 Bonding material
50 Wireless communication circuit
51 Input terminal
52 Transmission amplifier
53 Switch
54 Filter
55 Phase shifter
56 Reception amplifier
57 Output terminal
100, 100A, 100B, 100C, 100D, 100E, 100F Wireless communication apparatus
121 First alignment mark
131 End fire antenna
160 Dipole antenna
161 First conductive wire layer
162 Second conductive wire layer
163 Third conductive wire layer
164 Fourth conductive wire layer
171 Terminal layer
180 Metal plate
221 Second alignment mark
241 Protrusion
251 Slit
C1, C2, C3, C4 Corner
CP Center position
FP1 First feeding point
FP2 Second feeding point
HL Second straight line
L1 First edge
L2 Second edge
L3 Third edge
L4 Fourth edge
VL First straight line
WA First wiring width
WB Second wiring width

The invention claimed is:

1. An antenna device, comprising:
a first antenna element including:
a first glass substrate; and
a first patch antenna on the first glass substrate; and
a second antenna element on a side of a surface of the first antenna element, wherein
the second antenna element includes:
a second glass substrate; and
a second patch antenna on the second glass substrate,
the second glass substrate includes:
a first recess opened on a side of a surface of the second glass substrate, wherein the side of the surface of the second glass substrate faces the first glass substrate; and
protrusions on a bottom surface of the first recess,
at least a part of the first patch antenna faces the second patch antenna through the first recess,
the second patch antenna is on an opposite side of the bottom surface of the first recess,
a shape of at least one of the first patch antenna or the second patch antenna in a plan view is a rectangle, and
a contour of at least one corner of four corners of the rectangle includes one of a curved line or a plurality of obtuse angles in the plan view.

2. The antenna device according to claim 1, wherein
the first antenna element further includes a first feeding point connected to the first patch antenna,
a shape of the first patch antenna in the plan view is rectangle,
a first straight line connects centers of a first pair of edges of the rectangle,
a second straight line connects centers of a second pair of edges of the rectangle,
the first feeding point is at a first position separated from the first straight line and the second straight line,
a first edge of the first pair of edges faces a second edge of the first pair of edges in a first direction,
a first edge of the second pair of edges faces a second edge of the second pair of edges in a second direction, and
the first direction intersects the second direction.

3. The antenna device according to claim 2, wherein the first feeding point is separated from the first straight line and the second straight line by 0.05 mm or more.

4. The antenna device according to claim 2, further comprising a feeding transmission line connected to the first feeding point, wherein
the feeding transmission line includes:
a first wiring portion; and
a second wiring portion connected in series to the first wiring portion, and
having a wiring width of the second wiring portion is different from a wiring width of the first wiring portion.

5. The antenna device according to claim 2, wherein the first antenna element further includes a second feeding point connected to the first patch antenna at a second position separated from the first feeding point.

6. The antenna device according to claim 5, wherein the second feeding point is separated from the first straight line and the second straight line by 0.05 mm or more.

7. The antenna device according to claim 5, wherein the first feeding point and the second feeding point are configured to connect to impedances having the same magnitude.

8. The antenna device according to claim 1, wherein
the first patch antenna is on a surface of the first glass substrate,
the antenna device further comprises a metal plate on the surface of the first glass substrate,
the metal plate is separated from the first patch antenna, and
the metal plate is fixed to an arbitrary potential.

9. The antenna device according to claim 1, wherein
the first glass substrate includes a second recess on a side of a surface of the first glass substrate,
the side of the surface of the first glass substrate facing the second glass substrate, and
the first patch antenna is on a bottom surface of the second recess.

10. The antenna device according to claim 9, wherein a boundary between an inner surface of the second recess and the bottom surface of the second recess has a rounded shape.

11. The antenna device according to claim 1, wherein a boundary between an inner surface of the first recess and the bottom surface of the first recess has a rounded shape.

12. The antenna device according to claim 1, further comprising a plurality of first recesses, wherein an aspect ratio of the plurality of first recesses is 3 or more and 8 or less, and the plurality of first recesses includes the first recess.

13. The antenna device according to claim 1, further comprising a conductor layer on an opposite side of the first patch antenna with the first glass substrate therebetween, wherein the conductor layer is fixed to an arbitrary potential.

14. The antenna device according to claim 1, wherein the first antenna element further includes a linear antenna on the first glass substrate.

15. An antenna device, comprising:

a first antenna element including:

a first glass substrate;

a first patch antenna on the first glass substrate; and a first feeding point connected to the first patch antenna, wherein a shape of the first patch antenna in a plan view is a rectangle, a first straight line connects centers of a first pair of edges of the rectangle, a second straight line connects centers of a second pair of edges of the rectangle, the first feeding point is at a position separated from the first straight line and the second straight line, a first edge of the first pair of edges faces a second edge of the first pair of edges in a first direction, a first edge of the second pair of edges faces a second edge of the second pair of edges in a second direction, and the first direction intersects the second direction; and a second antenna element on a side of a surface of the first antenna element, wherein the second antenna element includes:

a second glass substrate; and a second patch antenna on the second glass substrate, wherein the second glass substrate includes:

a recess opened on a side of a surface of the second glass substrate, wherein the side of the surface of the second glass substrate faces the first glass substrate; and protrusions on a bottom surface of the recess, at least a part of the first patch antenna faces the second patch antenna through the recess, and the second patch antenna is on an opposite side of the bottom surface of the recess.

16. A wireless communication apparatus, comprising:

an antenna device; and a wireless communication circuit connected to the antenna device, wherein the antenna device includes:

a first antenna element including:

a first glass substrate; and a first patch antenna on the first glass substrate; and a second antenna element on a side of a surface of the first antenna element, wherein the second antenna element includes:

a second glass substrate; and a second patch antenna on the second glass substrate, a shape of at least one of the first patch antenna or the second patch antenna in a plan view is a rectangle, a contour of at least one corner of four corners of the rectangle includes one of a curved line or a plurality of obtuse angles in the plan view, the second glass substrate includes:

a recess opened on a side of a surface of the second glass substrate, wherein the side of the surface of the second glass substrate faces the first glass substrate; and protrusions on a bottom surface of the recess, at least a part of the first patch antenna faces the second patch antenna through the recess, and the second patch antenna is on an opposite side of the bottom surface of the recess.

* * * * *